(12) United States Patent
Rohrabaugh et al.

(10) Patent No.: US 7,823,083 B2
(45) Date of Patent: *Oct. 26, 2010

(54) METHOD, BROWSER CLIENT AND APPARATUS TO SUPPORT FULL-PAGE WEB BROWSING ON HAND-HELD DEVICES

(75) Inventors: Gary B. Rohrabaugh, Bellingham, WA (US); Scott A. Sherman, Seattle, WA (US)

(73) Assignee: SoftView LLC, Bellingham, WA (US)

(*) Notice: Subject to any disclaimer, the term of this patent is extended or adjusted under 35 U.S.C. 154(b) by 537 days.

This patent is subject to a terminal disclaimer.

(21) Appl. No.: 11/738,932

(22) Filed: Apr. 23, 2007

(65) Prior Publication Data

US 2007/0288855 A1    Dec. 13, 2007

Related U.S. Application Data

(63) Continuation of application No. 09/878,097, filed on Jun. 8, 2001, now Pat. No. 7,210,099, which is a continuation-in-part of application No. 09/828,511, filed on Apr. 7, 2001, now abandoned.

(60) Provisional application No. 60/211,019, filed on Jun. 12, 2000, provisional application No. 60/217,345, filed on Jul. 11, 2000.

(51) Int. Cl.
G06F 17/00    (2006.01)
(52) U.S. Cl. .................. 715/815; 715/249; 715/733; 715/760; 715/801
(58) Field of Classification Search .......... 715/800, 715/801–802, 815, 204, 234, 143, 147, 273
See application file for complete search history.

(56) References Cited

U.S. PATENT DOCUMENTS 5,615,384 A    3/1997    Allard et al.

(Continued)

FOREIGN PATENT DOCUMENTS

GB    0009129.8    4/2000

(Continued)

OTHER PUBLICATIONS

Schaffer et al- "Navigating Hierarchically Cluster Networks through Fisheye and Full-Zoom Methods". Mar. 24, 1998- pp. 1-20.*

(Continued)

*Primary Examiner*—Doug Hutton
*Assistant Examiner*—Quoc A Tran
(74) *Attorney, Agent, or Firm*—Law Office of R. Alan Burnett

(57)    ABSTRACT

Method, browser client, and apparatus for enabling users of hand-held devices to perform full page browsing of Web pages with zooming and panning. A proxy or proxy server is used to process HTML-based Web content corresponding to requested Web pages in their original form and generate translated content that is configured to be processed by a browser client running on hand-held devices to support full page browsing of the Web pages with zooming and panning support while preserving the original page layout and design of the Web pages. Thus, users are enabled to use their hand-held devices to browse their favorite Web pages in a similar manner to which they are accustomed when using their desktop browser. Moreover, since the original form of the HTML-based Web content is employed, hand-held device users are enabled to browse from among billions of Web pages available via the Internet.

86 Claims, 22 Drawing Sheets

U.S. PATENT DOCUMENTS

| | | | |
|---|---|---|---|
| 5,897,644 | A | 4/1999 | Nielson |
| 5,952,994 | A | 9/1999 | Ong et al. |
| 5,956,025 | A | 9/1999 | Goulden et al. |
| 5,966,135 | A | 10/1999 | Roy et al. |
| 6,011,905 | A | 1/2000 | Huttenlocher et al. |
| 6,057,854 | A | 5/2000 | Davis, Jr. et al. |
| 6,076,166 | A | 6/2000 | Moshfeghi et al. |
| 6,211,856 | B1 | 4/2001 | Choi et al. |
| 6,300,947 | B1 | 10/2001 | Kanevsky |
| 6,337,693 | B1 | 1/2002 | Roy et al. |
| 6,421,733 | B1 | 7/2002 | Tso et al. |
| 6,449,639 | B1 | 9/2002 | Blumberg |
| 6,456,305 | B1 | 9/2002 | Qureshi et al. |
| 6,456,308 | B1 | 9/2002 | Agranet et al. |
| 6,457,030 | B1 | 9/2002 | Adams et al. |
| 6,466,203 | B2 | 10/2002 | Van Ee |
| 6,546,397 | B1 | 4/2003 | Rempell |
| 6,553,410 | B2 | 4/2003 | Kikinis |
| 6,556,217 | B1 | 4/2003 | Mäkipää |
| 6,615,212 | B1 | 9/2003 | Dutta et al. |
| 6,674,445 | B1 * | 1/2004 | Chithambaram et al. .... 345/619 |
| 6,704,024 | B2 | 3/2004 | Robotham et al. |
| 6,781,600 | B2 | 8/2004 | Anwar |
| 6,829,746 | B1 | 12/2004 | Schwerdtfeger et al. |
| 6,857,102 | B1 | 2/2005 | Bickmore et al. |
| 6,886,034 | B2 | 4/2005 | Blumberg |
| 6,925,595 | B1 * | 8/2005 | Whitledge et al. .......... 715/234 |
| 6,978,418 | B1 | 12/2005 | Bain et al. |
| 6,996,533 | B2 | 2/2006 | Ikeda et al. |
| 7,023,572 | B2 | 4/2006 | Tuli |
| 7,055,095 | B1 | 5/2006 | Anwar |
| 7,072,984 | B1 | 7/2006 | Polonsky et al. |
| 7,219,309 | B2 | 5/2007 | Kaasila et al. |
| 7,308,649 | B2 | 12/2007 | Ehrich et al. |
| 7,450,114 | B2 | 11/2008 | Anwar |
| 2001/0015719 | A1 | 8/2001 | Van Ee et al. |
| 2001/0047428 | A1 | 11/2001 | Hunter |
| 2002/0018072 | A1 * | 2/2002 | Chui .......................... 345/667 |
| 2002/0023110 | A1 | 2/2002 | Fortin et al. |
| 2002/0030699 | A1 | 3/2002 | Van Ee |
| 2002/0112237 | A1 | 8/2002 | Ketts |
| 2002/0158908 | A1 | 10/2002 | Vaajala et al. |
| 2004/0049598 | A1 | 3/2004 | Tucker et al. |
| 2005/0144256 | A1 | 6/2005 | Blumberg |

FOREIGN PATENT DOCUMENTS

| | | |
|---|---|---|
| GB | 2344197 A | 5/2000 |
| JP | 10-334082 A | 12/1998 |

OTHER PUBLICATIONS

Lars Erik Holmquist"Focus+Content Visualization with Flip Zooming and the Zoom Browser"- Published Mar. 1997 by Chi 97- pp. 1-6.*

Jones et al. "From the large screen to the small screen—retaining the designer's design for effective user interaction," IEEE Colloquium on Issues for Networked Interpersonal Communicators, May 1997, pp. 3/1-3/4.

Pacchiano, "Adobe's New View," Computer Shopper, vol. 19, No. 4, Apr. 1999, p. 346.

Scalable Vector Graphics (SVG) Specification, W3C Working Draft Feb. 11, 1999 WD-SVG-19990211, http://www.w3.org/TR/1999/WD-SVG-19990211/ (HTML format—initial page).

Scalable Vector Graphics (SVG) Specification, W3C Working Draft Apr. 12, 1999 WD-SVG-19990412, http://www.w3.org/TR/1999/WD-SVG-19990412/ (HTML format—initial page).

Scalable Vector Graphics (SVG) Specification W3C Working Draft Feb. 11, 1999 http://www.w3.org/TR/1999/WD-SVG-19990211/—Pub Feb. 11, 1999 by W3C pp. 1-6.

Fisher, B., G. Agelidis, J. Dill, P. Tan, G. Collaud and C. Jones. "CZWeb: Fish-Eye Views for Visualiziang the World-Wide Web", Proc. Seventh Int. Conf. on Human-Computer Interaction (HCI International '97), pp. 719-722, 1997.

Benjamin B. Bederson et al., Pad++: A Zoomable Graphical Sketchpad for Exploring Alternate Interface Physics, Sep. 19, 1995, pp. 1-30, http://www.cs.unm.edu/pad++.

Benjamin B. Bederson et al., A Zooming Web Browser, SPIE 1996, http://www.cs.umd.edu/hcil/jazz/learn/papers/spie-96-webbrowser.pdf, entirety (pages not numbered).

Specification for Simple Vector Format (SVF) v1.1 Jan. 16, 1995, pp. 1-9.

Specification for Simple Vector Format (SFV) v2.0 Dec. 6, 2000, http://www.svf.org/spec.html, pp. 1-20.

Changes to SVF (Date unknown), pp. 1-2.

Scalable Vector Graphics (SVG) 1.0 Specification, W3C Candidate Recommendation Nov. 2, 2000, pp. 1-513.

Introduction to SVG, part of WD-SVG-19990211, http://www.w3.org/TR/1999/WD-SVG-19990211/intro.html#Document . . . , pp. 1-3.

Janus Boye, SVG Brings Fast Vector Graphics to Web, Jul. 29, 1999 http://www.irt.org/articles/js176/, pp. 1-5.

Vector Markup Language (VML), World Wide Web Consortium Note May 13, 1998, NOTE-VML-19980513, http://www.w3.org/TR/1998/NOTE-VML__19980513, pp. 1-47.

Precision Graphics Markup Language (PGML), World Wide Web Consortium Note Apr. 10, 1998, NOTE-PGML-19980410, http://www.w3.org/TR/1998/NOTE-PGML-19980410, pp. 1-31.

PCT International Search Report for International Application No. PCT/US01/40920, International Searching Authority, European Patent Office, Dec. 27, 2001, pp. 1-8.

PCT International Preliminary Exam Report for International Application No. PCT/US01/40920, International Preliminary Examining Authority, European Patent Office, Jun. 20, 2002, pp. 1-5.

Dennis, "Webraska Joins W3C for Next Generation Internet Graphics," Newsbytes, May 8, 2000, entirety (pages not numbered).

Fox et al. "Experience With Top Gun Wingman: A Proxy-Based Graphical Web Browser for the 3Com PalmPilot" Proceedings of Middleware '98, 1998, entirety (pages not numbered).

"Tadpole Technology: ILOG technology within Tadpole's Cartesia Redline system making repairs simpler," M2 Presswire, Jan. 1999, entirety (pages not numbered).

Thryft, "Wireless link ramped for 'always on' Internet," EETimes, Mar. 23, 1999, pp. 1-4.

Bharadvaj et al., "An Active Transcoding Proxy to Support Mobile Web Access," Proc. of the IEEE Symposium on Reliable Distributed Systems, 1998, entirety (pages not numbered).

Björk, et al., "West: A Web Browser for Small Terminals," Proceedings of the 12 ACM symposium on User Interface Software and Technology (1999), entirety (pages not numbered).

Holmquist, "The Zoom Browser," Human IT Tridskrift för studier av IT ur ett humanvetenskaplight perspektive, Mar. 1998, pp. 1-18.

Chapple, "Rethinking the role of an embedded Internet client in digital set-top boxes," WebTV Workshop Submission Paper, Jun. 1998, http://www.w3.org/Architecture/1998/06/Workshop/paper11/, pp. 1-4.

Graham, "Mobile SVG at BitFlash Inc.", May 2001, http://www.w3.org/Talks/2002/1007-DI-Helsinki/bitflash/index.html, pp. 1-4.

Koncz, "Working with Autodesk Mapguide," Nov. 2000, http://www.directionsmag.com/article.php?article_id=77&trv=1, pp. 1-6.

Holmquist "Flip Zooming: Focus+Context Visualization of Linearly Ordered Discrete Visual Structures," Published 2000, pp. 27-53.

Complaint, SoftView LLC v. Apple Inc. et al. Case No. 1:10-cv-00389-JJF-LPS, the United States District Court for the District of Delaware.

Report on the Filing or Determination of an Action Regarding a Patent or Trademark Case 1:10-cv-00389-JJF-LPS.

Official USPTO Action for U.S. Appl. No. 11/868,124 Mailed Aug. 24, 2010 pp. 1-15.

* cited by examiner

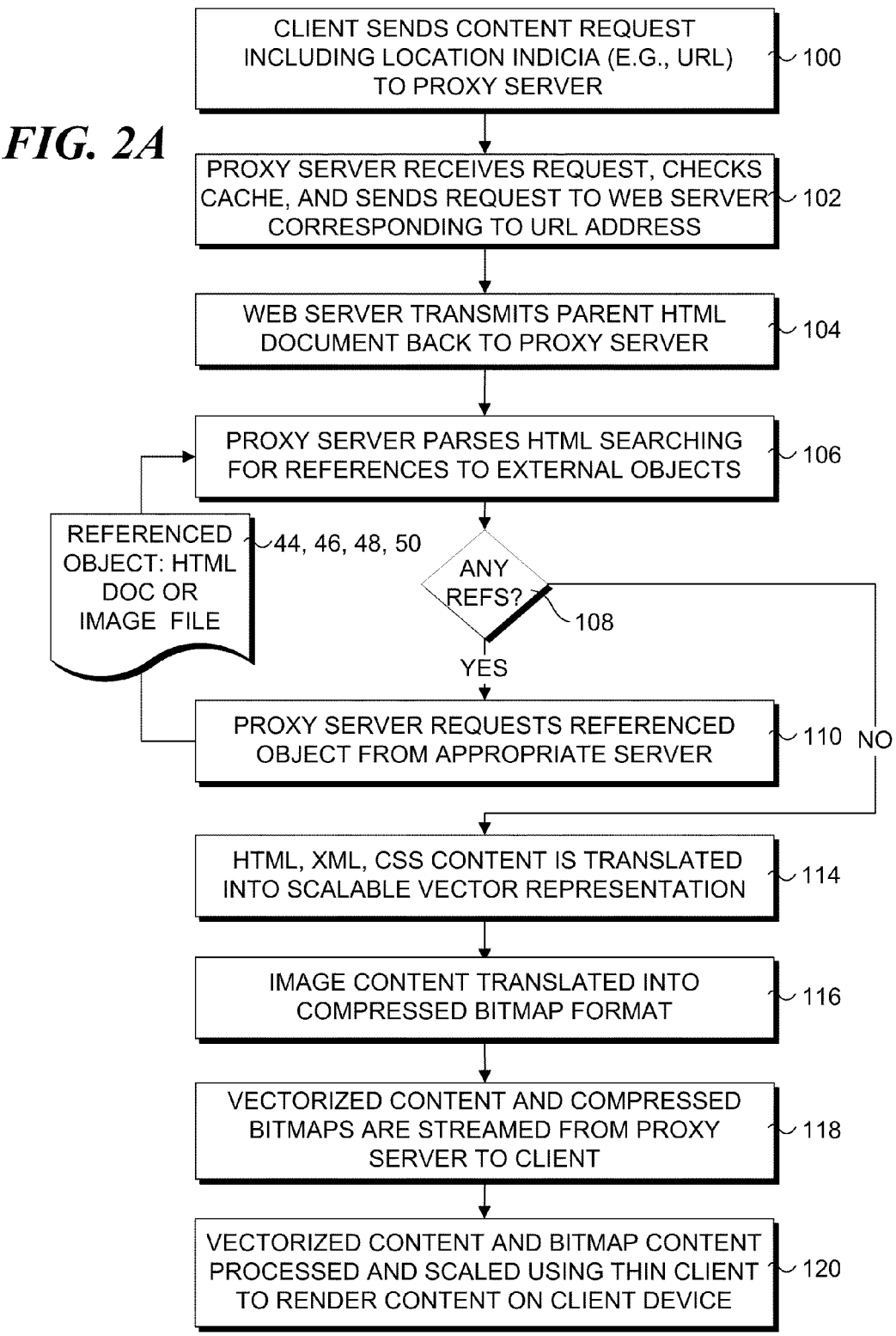

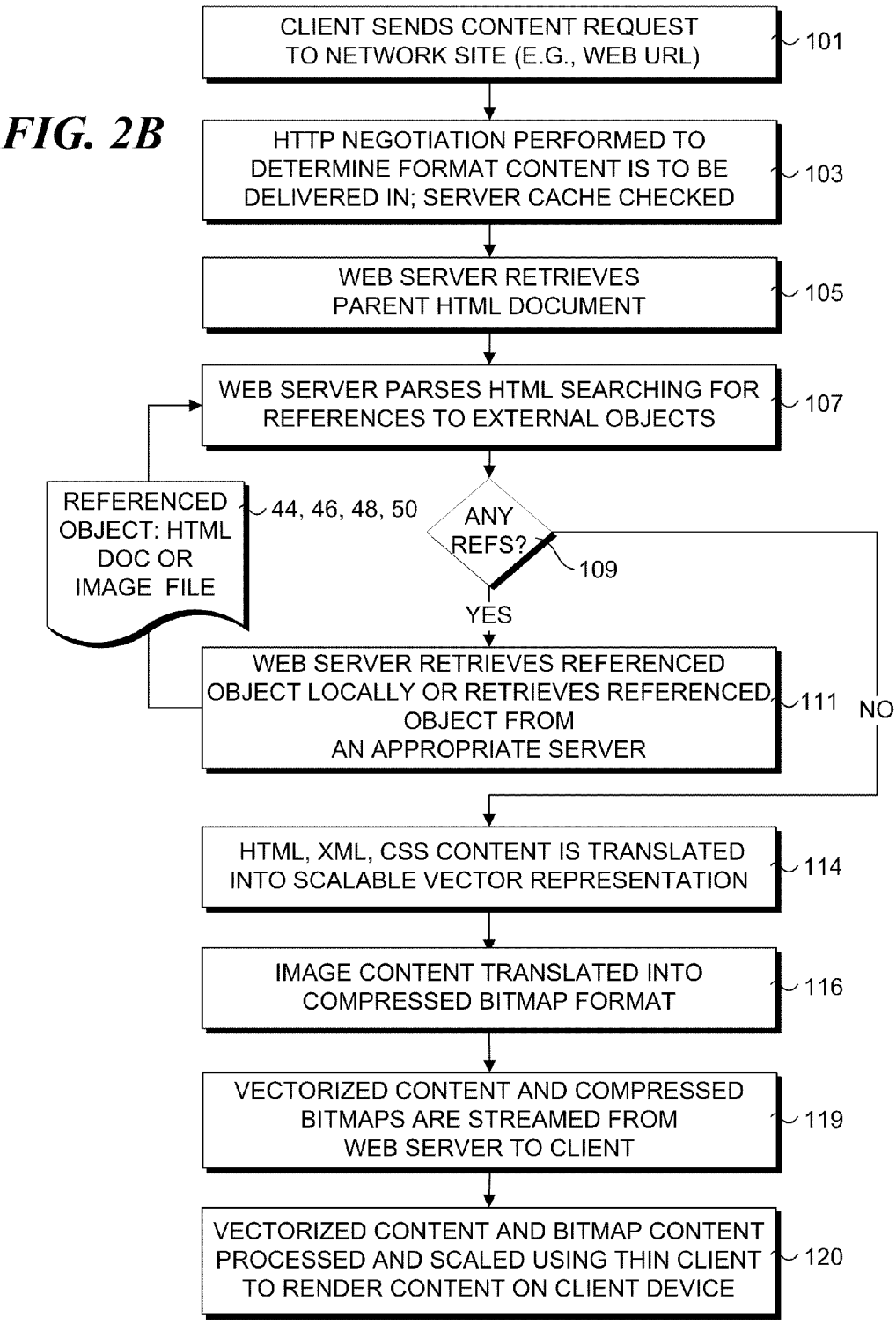

METHOD, BROWSER CLIENT AND APPARATUS TO SUPPORT FULL-PAGE WEB BROWSING ON HAND-HELD DEVICES

RELATED APPLICATIONS

This application is a Continuation of U.S. Non-provisional application Ser. No. 09/878,097, filed Jun. 8, 2001, (issued as U.S. Pat. No. 7,210,099) entitled "RESOLUTION INDEPENDENT VECTOR DISPLAY OF INTERNET CONTENT," which is a Continuation-in-Part of U.S. Non-provisional application Ser. No. 09/828,511, filed Apr. 7, 2001, (Abandoned) entitled "RESOLUTION INDEPENDENT VECTOR DISPLAY OF INTERNET CONTENT," the benefit of the filing dates of which is claimed under 35 U.S.C. §120. U.S. Non-provisional application Ser. No. 09/878,097 further claims the benefit of the filing dates of U.S. Provisional Application No. 60/211,019, filed Jun. 12, 2000, entitled "METHOD AND SYSTEM FOR RESOLUTION INDEPENDENT DISPLAY OF HTML AND XML CONTENT" and U.S. Provisional Application No. 60/217,345, filed Jul. 11, 2000, entitled "METHOD AND SYSTEM FOR SELECTION, RETRIEVAL, AND CONVERSION OF COMPUTER CONTENT TO VECTOR FORMAT FOR RESOLUTION INDEPENDENT DISPLAY," under 35 U.S.C. §119(e). The disclosure of each of the foregoing applications is incorporated by reference in its entirety herein for all purposes.

This application also contains subject matter related to Divisionals (of U.S. Pat. No. 09/878,097) U.S. Non-provisional application Ser. Nos. 11/045,649 (issued as U.S. Pat. No. 7,584,423) entitled METHOD, PROXY AND SYSTEM TO SUPPORT FULL-PAGE WEB BROWSING ON HAND-HELD DEVICES, and 11/045,757 (issued as U.S. Pat. No. 7,461,353) entitled SCALABLE DISPLAY OF INTERNET CONTENT ON MOBILE DEVICES, both filed Jan. 28, 2005. This application also contains subject matter related to U.S. Non-provisional application Ser. Nos. 11/735,477 and 11/735,482, both filed on Apr. 15, 2007, 11/738,486 filed on Apr. 21, 2007, 11/868,124 filed on Oct. 5, 2007, and 12/326,092 filed on Dec. 1, 2008.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The invention relates generally to viewing of Internet content, and more particularly concerns to novel server-client distributed processing of Internet and World Wide Web content to scalable forms for resolution-independent rendering and zoom- and pan-enabling the display of Web content.

2. Description of the Related Art

Text only Internet information browsers began as a project at the CERN, European Organization for Nuclear Research, facility in Geneva Switzerland. From its inception the intent was to provide a mesh or web of access to data with a common user interface. Browsers moved from the academic environment when NCSA, the National Center for Supercomputing Applications at the University of Illinois in Urbana-Champaign developed Mosaic, an Internet information browser and World Wide Web client.

Internet content is stored in multiple file formats. These formats include HTML (Hyper Text Markup Language) and XML (eXtended Markup Language) as well as graphic file format GIF (Graphics Interchange Format) and JPEG (Joint Photographic Experts Group). These four file formats constitute the majority of Internet content. Font size and resizing display area for content can alter the size of the display of Internet content in existing browsers. The majority of Internet content displays as a flat single resolution with no browser support for zoom.

Much of the Internet content has been designed for display on desktop computers with a single target resolution. Even though HTML has the ability to adapt to changes in screen resolution, major Internet content providers have chosen to create their Web pages using fixed resolution structures, such as tables. This gives them the ability to control the look and feel of their Web sites. This fixed resolution approach has evolved to the point that the fixed resolution layout of Web pages has become the most common method to brand or uniquely identify Web sites. While this fixed resolution approach is good for site branding and product differentiation it does present a daunting technical problem for display of Internet content (designed for desktop computers) on small screen, low resolution, or different aspect ratio devices, such as cell phones and hand held computers.

BRIEF SUMMARY OF THE INVENTION

Other features of the present invention will be apparent from the accompanying drawings and from the detailed description that follows.

In accordance with aspects of the invention, methods, browser clients, and apparatus are disclosed for enabling users of hand-held devices to perform full page browsing of Web pages with zooming and panning. A proxy or proxy server is used to process HTML-based Web content corresponding to requested Web pages in their original form and generate translated content that is configured to be processed by a browser client running on hand-held devices to support full page browsing of the Web pages with zooming and panning support while preserving the original page layout and design of the Web pages. Thus, users are enabled to use their hand-held devices to browse their favorite Web pages in a similar manner to which they are accustomed when using their desktop browser. Moreover, since the original form of the HTML-based Web content is employed, hand-held device users are enabled to browse from among billions of Web pages available via the Internet.

In accordance with further aspects of proxy-side operations, a proxy or proxy server receives requests originating at browser clients running on hand-held devices to access Web pages. For hand-held devices such as mobile phones, such requests are typically routed to the proxy via a mobile service provider network. For wireless hand-held devices having wireless access to the Internet, such requests may typically be routed directly to the proxy via the Internet using associated wireless connections. In response to a Web page access request, the proxy server retrieves HTML-based Web content corresponding to the Web page in its original format, which defines the original page layout and design of the content on the Web page. The HTML-based Web content is processed to generate translated content that is configured to be processed by the browser client that originated the request. The translated content is then returned to the browser client (via the mobile service provider network or wireless Internet link, as applicable), with optional compression and/or encryption. Each browser client is configured to process the translated content it receives from the proxy to support full page browsing on the hand-held device running the client, wherein the user is enabled to browse the Web page with support for zooming and panning while the original page layout and design of the Web page content is preserved.

According to other aspects of the invention, the browser clients may be configured as thin clients that are enabled to support full Web page browsing on host devices having limited processing and/or memory resources. According to yet further aspects, translated content may be returned to browser clients via multiple connections. According to still further aspects, the amount of content delivered to a requesting device (when comparing the amount of translated content to the page's original HTML-based page content) may be reduced up to 90% (depending on the particular page's content), thus greatly reducing the amount of bandwidth consumed by mobile browsing clients and the like.

BRIEF DESCRIPTION OF THE DRAWINGS

The appended claims set forth the features of the invention with particularity. The invention, together with its advantages, may be best understood from the following detailed description taken in conjunction with the accompanying drawings of which:

FIG. 2A is a flowchart illustrating how data is retrieved, processed and transferred in accordance with the system infrastructure of FIG. 1A;

FIG. 2B is a flowchart illustrating how data is retrieved, processed and transferred in accordance with the system infrastructure of FIG. 1B;

DETAILED DESCRIPTION OF THE INVENTION

Figure 1A:
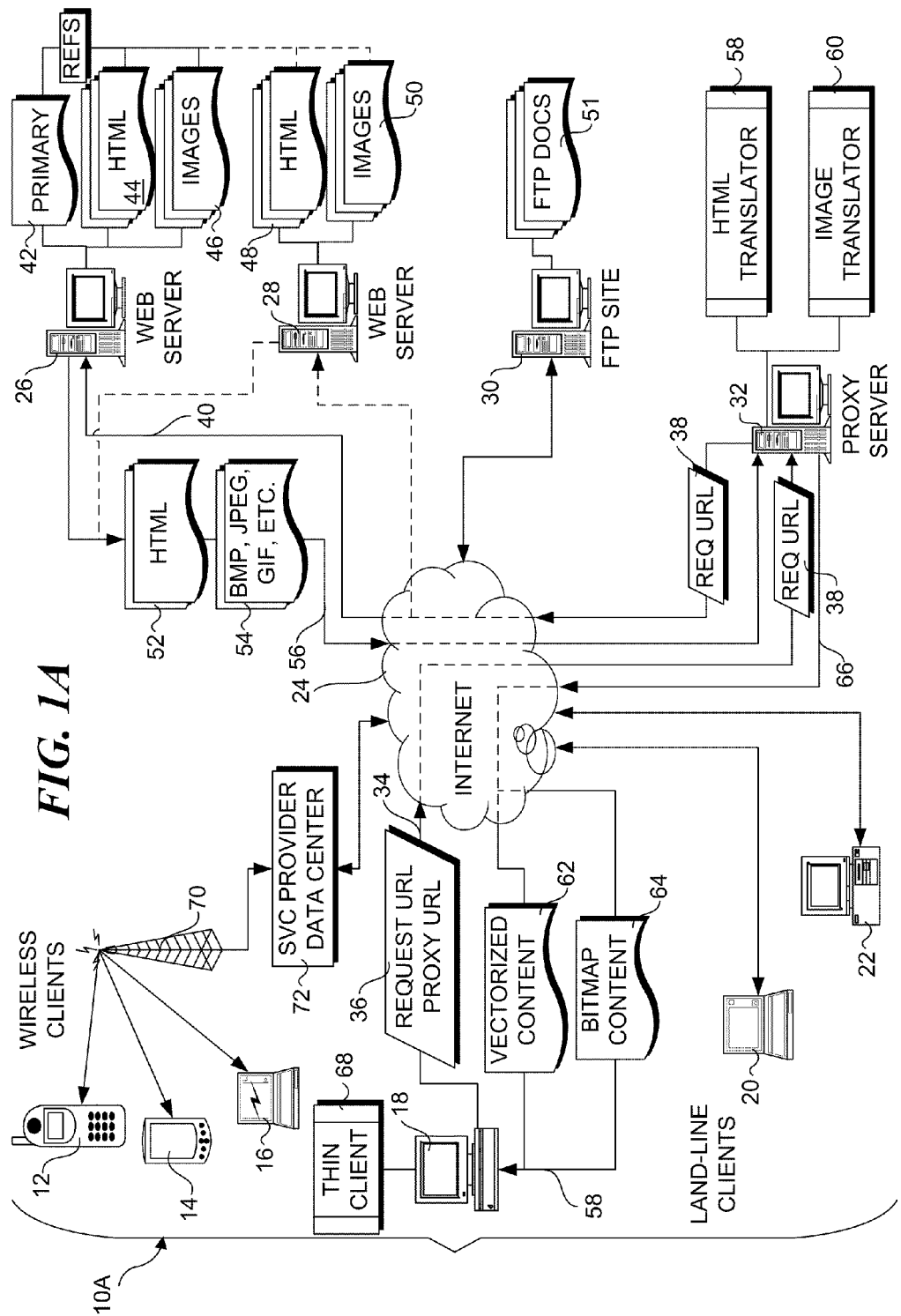
FIG. 1A is a block schematic diagram illustrating a first exemplary system infrastructure in accordance with the present invention in which content translation services are performed by a third-party proxy service that translates content requested from a client that is retrieved from one or more network resources into a scalable vector representation and delivers the translated content to the client.

Apparatus and methods are described for creating resolution independent vector display of Internet content to allow it to be scaled (zoomed) larger and smaller for better viewing or to fit any resolution or screen size. In addition, infrastructure and methods are provided for delivering such content to clients.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various operations, which will be described below. The operations of the present invention may be performed by hardware components or may be embodied in machine-executable instructions, which may be used to cause a general-purpose or special-purpose processor or logic circuits programmed with the instructions to perform the operations. Alternatively, the operations may be performed by a combination of hardware and software.

The present invention may be provided as a computer program product that may include one or more machine-readable mediums having stored thereon instructions, which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnetic or optical cards, flash memory, or other type of media/machine-readable medium suitable for storing electronic instructions. Moreover, the present invention may also be downloaded as a computer program product.

Client Overview

According to one embodiment, an ultra-thin client-side viewer provides the graphics, linking, caching, and function handling capabilities necessary for extending the web to almost any platform. It is designed as a lightweight browser (micro-browser) running directly on device operating systems. In alternative embodiments, the client-side viewer may be deployed as a standard browser plug-in, or Java applet for extending browser functionality. In one embodiment, the client-side viewer attains its small size and efficiency by taking advantage of the power of SVF (Simple Vector Format) to describe almost any current web content. SVF files can be handled with a tiny fraction of the client code required by normal web browsers because current browsers must interpret a large and growing number of file types and their idiosyncrasies. SVF was originally designed to handle a superset of the most commonly used file formats in the complex world of CAD. It can accommodate not only new graphical functions, but the storage and transfer of almost any foreseeable new functional capability. SVF has been under consideration by the W3C (World Wide Web Consortium) for adoption as a standard for vector content on the World Wide Web.

By working tightly with a server-side content translator, web content and functionality can be passed seamlessly to the end user platform without any degradation in the look or feel of the output. In addition, because the resulting file graphics are handled as vectors, the end user can control real time changes in the size of text and graphics as well as what portion of the file is viewable in the display. This "zoom and pan" capability, familiar to CAD and other vector content software users, adds dramatically to the usability of non-standard display sizes. For very small displays, real time zooming and panning allows the user to see graphics and text at sizes that make them easily readable, and then "back up" to view an entire page for context or pan in any direction for navigation. Because the client-side viewer manipulates vectors, there is no loss in quality as the display is zoomed. The graphics rendering engine within the client is so efficient that file manipulation happens in a fraction of a second. There is no perceptible wait for the user as the file is resized, or the window is repositioned. Content created for one display resolution now can be sized, real time, for any other display without degradation. Besides making small displays eminently usable, this technology extends web content into some surprising new arenas. For example, it enables normal desktop displays to be effective for individuals with visual impairment, or for content designed for 640×480 standard PC monitors to be shown without degradation on web billboards now appearing in cities like Seattle and San Francisco.

With a client of such extraordinary power packed in a tiny footprint, end user device manufacturers can free up valuable memory space for pre-fetching, caching and pre-loading content, dramatically improving performance for use in low bandwidth and portable applications. In the example of a wireless handheld device where expensive flash memory must be used instead of more cost effective bulk storage technology, the difference between consuming 10's of megabytes of flash memory with a standard browser versus running the client-side viewer described herein is dramatic.

Those "saved" megabytes of memory are now available for impressive interfaces, caching of often used content, and pre-fetching of intelligently selected linked files or pre-loading of content for targeted applications. For example, in a mapping application, the map tiles surrounding the viewed map could be downloaded and stored while the user was working with the initial tile, enabling an experience remarkably free from the current frustrations of waiting for a new map to be transferred for even the smallest change in magnification or coverage. If the user knows ahead of time what city they will visit on a business trip, maps and additional travel information in great detail could also be pre-loaded using a high bandwidth connection at home or in the office before heading out to shop or conduct business in the city. Additionally, SVF is a more efficient way to store web content. Resulting content files are reduced in size by anywhere from 20 to 80 percent over their source. SVF is also very compressible. With target file size reduction in the range of 90%, SVF files can take up as little as $\frac{1}{10}^{th}$ the space of the web files in current use. This means that pre-translated content can be moved up to 10 times the rate of current web pages, and as much as 10 times as many pages, maps, stock charts, etc. can be stored for instant retrieval on the hand held platform as can be handled with current web technology.

When used on content created natively in SVF, additional capability can be extended to the client-side viewer.

Graphing the performance of stocks over time is only one use of SVF's ability to handle streams of data. Handling the output from financial systems, transactional systems, ERP packages, and CRM systems becomes easier and more flexible. Of course, systems integrators don't have to use these powerful capabilities to start with. If the target system provides web interfaces, these can be viewed, as designed, with no additional software to write, and no changes to the design or layout of the interface.

Server Overview

Enabling the client-side viewer to be so small and powerful is the server-side content translator. The server-side content translator rapidly translates Web content to SVF, compresses and encrypts the SVF results if desired, and transfers the vector formatted results to the client-side viewer. Alternatively, SVF files can be cached or stored in a file system for fetching and transfer at a later time. Pre-translated or cached content transfers are significantly faster as no conversion overhead is incurred, and file sizes are reduced using the more efficient SVF. Combine that with standard compression algorithms selectable for use with the client-side viewer for additional performance improvements.

During the translation process, and in the process of serving cached, pre-translated, or native SVF content, output files are "streamed" to the client-side viewer. Although this does not decrease the total time for file transfer, it can significantly improve the effective system performance for the end user. Content can be selectively streamed, with text and links coming through first, followed by graphic images and other content, for example. Should the user be accessing a link, rather than having interest in the entire file served, links can be selected early in the transfer and the next file download started immediately. In addition to streaming, the server-side content converter may also layer the content by type. This means that text can be put in one layer, links in another, GIF images in another, Javascript in another and so on. Layers can be turned on or off depending upon client capabilities, making files for less capable clients, or for users interested in a reduced functionality, higher transfer performance mode to be handled automatically.

All operational modes may be controlled through an administrative interface or accessible through a straightforward API (Application Program Interface). Furthermore, the system works with existing firewalls and within standard security protocols. In more secure modes, the server-side content converter and the client-side viewer may operate using Public/Private key authentication and encryption.

Exemplary System Infrastructures

Figure 1B:
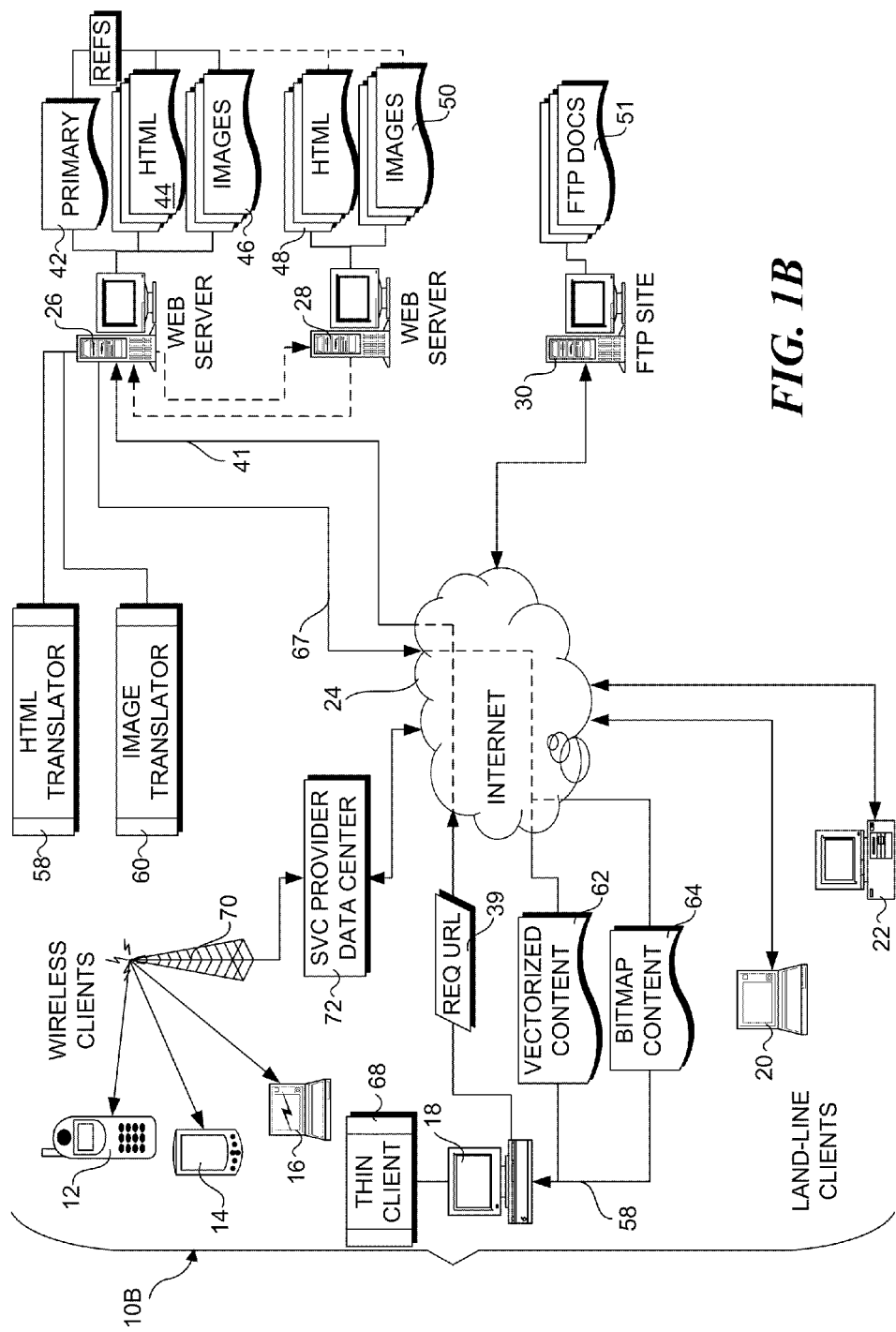
FIG. 1B is a block schematic diagram illustrating a second exemplary system infrastructure in which the translation of content is performed at a content provider's web site and delivered directly to the requesting client.
Figure 1C:
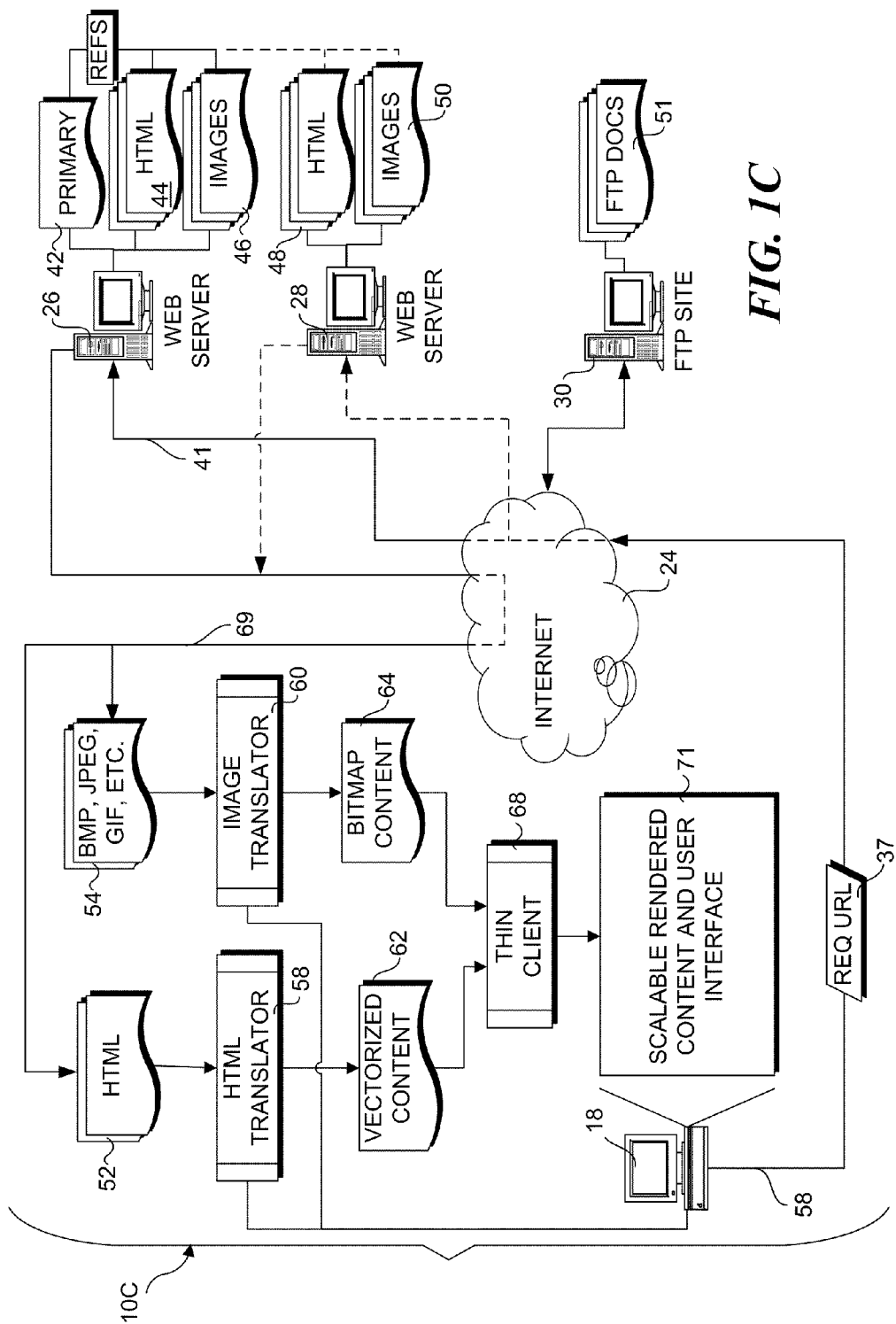
FIG. 1C is a block schematic diagram illustrating a third exemplary system infrastructure in which content received from one or more network sources is translated into a scalable vector representation at the client.

In the following paragraphs, a description of three exemplary system infrastructures is provided. Schematic illustrations of these system infrastructures are shown in FIGS. 1A, 1B, and 1C. It is noted that like-numbered components in these Figures perform substantially the same function. Therefore, any discussion of the functions of a component with reference to one or more of the infrastructures generally may apply to the other infrastructures as well, unless specifically noted otherwise.

A first of exemplary system infrastructure 10A for implementing the invention is shown in FIG. 1A. Infrastructure 10A enables various clients, including wireless devices such as a cellular phone 12, a wireless-enabled PDA 14, and a wireless-enabled laptop computer 16, as well as landline computers 18, 20, and 22, to request content that is accessible via a network such as the Internet 24 to be retrieved from selected network resources, including web servers 26 and 28 and an FTP site 30, wherein the content is translated into a scalable vector representation (e.g., SVF, also referred to herein as "vectorized content") through use of a proxy server 32 and sent to the requesting client. Upon being received by the client, the vectorized content is processed and rendered using a thin client to enable a user to view the content on the client device.

Figure 2C:
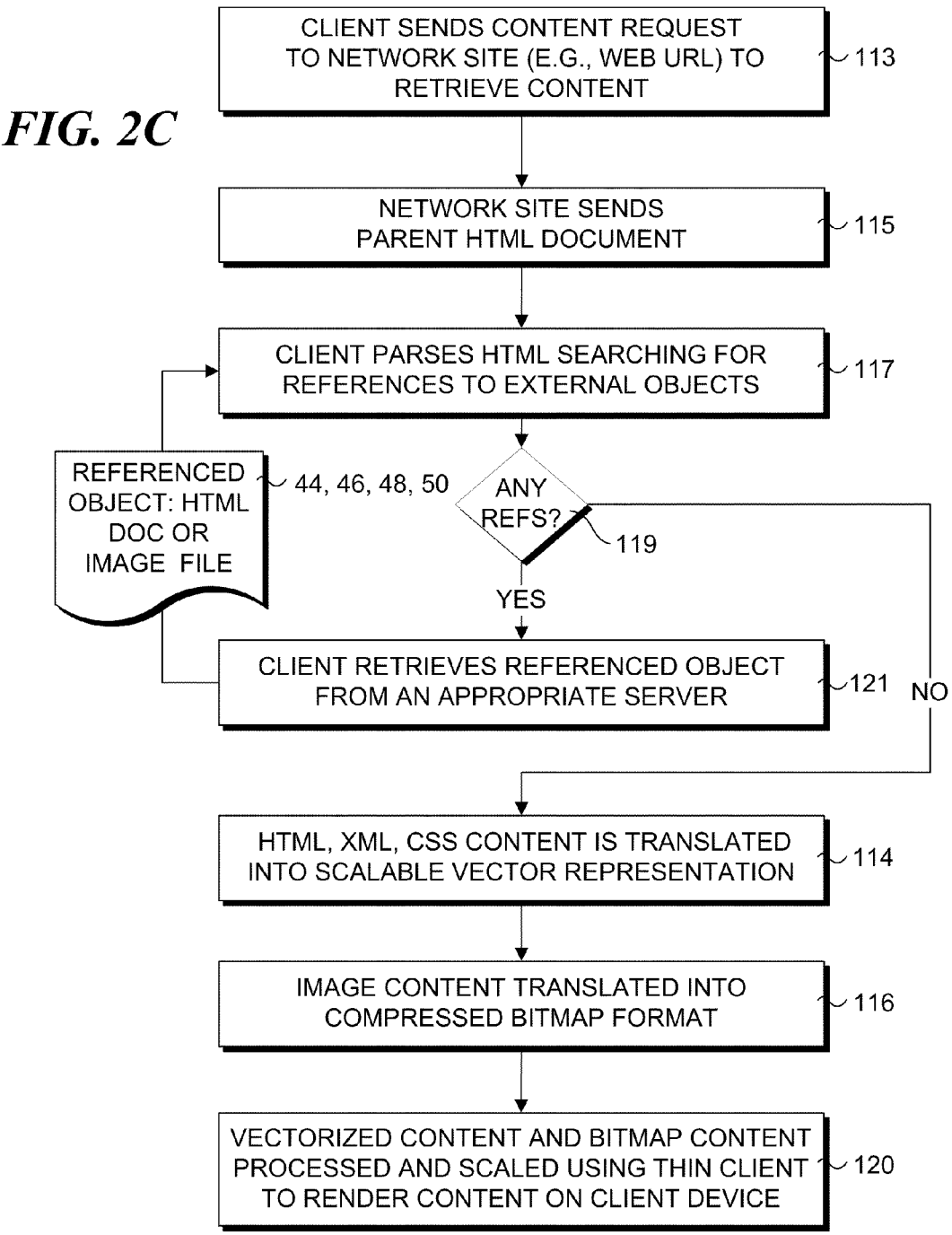
FIG. 2C is a flowchart illustrating how data is retrieved, processed and transferred in accordance with the system infrastructure of FIG. 1C.

With reference to the flowchart of FIG. 2A, the foregoing process is initiated by a client in a block 100, wherein the client submits a request to proxy server 32 to retrieve and convert selected content. As depicted by a transfer path 34, this comprises sending data 36, which includes content network location indicia from which the content can be retrieved and proxy server network location information by which the content request may be delivered to over Internet 24 to proxy server 32. Typically, it will be desired to retrieve a particular web page. Accordingly, the content network location indicia will comprise a URL (uniform resource locator) for the web page. Similarly, the proxy server network location information may also comprise a URL corresponding to a network access point for the proxy server. Optionally, the location information may comprise a network IP address for one or both of the content location and the proxy server location. If the content is to be retrieved from an Internet resource, the request will typically be sent using the HyperText Transfer Protocol (HTTP) over the TCP/IP transport.

Next, in a block 102, the request is received by the proxy server and the proxy server checks its cache to see if it already has the request content in its cache. If it does, it sends this cached content back to the client. If it does not have the requested content cached, the proxy server sends out a request to retrieve the content from the network resource. For illustrative purposes, it will be assumed for the present example that the desired content comprises a web page that is stored on web server 26. Typically, when the requested content comprises a web page, the content may be retrieved using conventional web content retrieval techniques, such as that employed by various modern browser clients, including Netscape Navigator and Internet Explorer. This generally comprises providing routing information, such as the URL for the web page (URL 38) to routing services provided by Internet 24, which routes the request to an appropriate network resource (e.g., web server 26), as depicted by a transfer path 40.

Typically, the URL will correspond to a web page whose content is stored by the web server in an HTML (HyperText Markup Language) document comprising HTML code and embedded text content, in addition to other optional content languages, that may contain references to other objects (e.g., HTML documents and graphic image files) stored locally to the server or stored on a remote server. For example, the HTML content corresponding to a single-frame web page is often stored in a single file, while multiple-frame web pages may comprise content that is stored in a single file or in multiple files. These files may be stored locally on the web server (e.g., on one of the server's hard disks), or on a local storage device connected to the web server via a local area network (LAN), such as a network attached storage (NAS) filer. Optionally, some of the web page's content may comprise one or more documents that are stored at remote locations that may be accessed via a WAN (wide area network) or the Internet.

HTML is a standardized language that describes the layout of content on a web page, and attributes of that content. This layout and attribute information is defined by sets of tags contained in HTML code corresponding to the page. The tags define various HTML layout and display information, including tables, paragraph boundaries, graphic image positions and bounding box sizes, typeface styles, sizes, and colors, borders, and other presentation attributes. A portion or all of a web page's text content may be contained in the parent HTML document corresponding to the URL. In addition to basic HTML, web page documents may contain XML (eXtensable markup language) code, as well as scripting language code, such as javascript. However, for simplicity, any documents containing web page content other than only graphic content that are discussed herein will be referred to as HTML documents.

In addition to HTML and other markup and scripting language content, it is very common for web pages to include graphical content. In general, graphical content is usually stored in an image file or files that are external from the parent HTML document for the web page. For example, the parent HTML document may contain one or more embedded image tags that reference the location where those images are stored. As before, the graphic images may be stored locally, or may be stored on remote servers that are accessed by the web server via a WAN, or the Internet. These files will typically comprise data stored in one of several well-known graphic formats, including bitmap files (BMP), GIF (Graphics Interchange Format) files, and JPEG (Joint Photographic Experts Group) files.

In response to receiving the request for content, web server 26 begins sending a parent HTML document 42 back to proxy server 32 in a block 104. In a block 106, the HTML content of the parent HTML document is parsed to search for references to external objects such as HTML frames and graphics. In a decision block 108, a determination is made to whether any references are found. For each reference to an external object that is found, proxy server 32 requests to have the object retrieved from an appropriate network resource (e.g., a web server) in a block 110, and data corresponding to the object is transmitted back to the proxy server, as depicted by locally accessible HTML documents 44 and graphic images 46, as well as remotely accessible HTML documents 48 and graphic images 50, which may be accessed via web server 28. If the external object is a graphic image, there is no further processing of the object at this point. If the object is an HTML document, the functions provided by blocks 106 and 108 are repeated. Generally, this set of processing functions is repeated iteratively until all of the external objects are retrieved. However, as described below, there will be some instances in which certain objects will be retrieved at a later point in time. In addition to content stored on web servers that are accessed using HTTP, content may also be retrieved from various network sites using the File Transfer Protocol (FTP), such as FTP documents 51, which are accessed via FTP server 30.

In general, HTML documents and graphic files will be sent as packetized data streams using HTTP over one or more TCP/IP network connections, wherein the data streams will usually be asynchronous. Retrieval of HTML documents and graphic files corresponding to the embedded references will usually require additional transfer time. Furthermore, graphic content oftentimes comprises significantly larger file sizes than HTML content, leading to significant transfer times in some instances. For simplicity, the transfer of the various HTML documents and graphic files for the content request are depicted by HTML documents 52 and graphic documents 54, which are transferred over a transfer path 56.

When the HTML documents and graphic content are received by proxy server 32, a scalable vector representation of the web page is generated in a block 114 by an HTML translator 58. In brief, HTML translator 58 translates HTML, XML, and cascaded style sheet (CSS) layout content into a scalable vector representation, such as SVF. Details of the HTML translation process are contained below. In addition, the graphic images are converted into a compressed bitmap format in a block 116 by a graphics translator 60. The vectorized content 62 and compressed bitmaps 64 are then streamed back to the client (i.e., computer 18) in a block 118, as depicted by a transfer path 66. In one embodiment, the content portions are sent in separate streams using multiple connections. In another embodiment, the content portions are sent via a multiplexed stream using a single connection. As the vectorized content and compressed bitmap data are received by the client device, they are processed by a thin client 68 running on the client device, whereby a representation of the original web page content may be rendered on the client device's display screen at various user-selectable scaled resolutions and pan offsets in a block 120, thereby enabling a user to more clearly see an overview or details in the web page. Further details of the client side processing are provided below.

As discussed above, wireless clients may also access the vectorized network (e.g., web site) content provided via proxy server 24. The majority of this process is identical to that described above for land-line clients (e.g., computers 18, 20, and 22), except for provisions required for sending data to and receiving data from wireless devices. In general, most wireless devices will access the Internet via a wireless service provider (i.e., a wireless telecommunications carrier) that is particular to that wireless device. Accordingly, a portion of the transmission path to and from proxy server 24 will comprise infrastructure provided by that service provider and/or shared with other service providers. For simplicity, this infrastructure is shown as a cellular tower 70 and a service provider data center 72, although it will be understood by those skilled in the art that the connection path may comprise additional infrastructure components, including appropriate gateways and routers, that enable wireless devices to access proxy server 24.

In some implementations, there will be no special formatting/protocol services that need to be performed by proxy service 24—from the viewpoint of the proxy service, it will be immaterial whether the client is a land-based or wireless client; the special handling provisions for wireless devices will be handled entirely by the service providers infrastructure transparently at both ends of the communications path. In other instances, it may be desired or necessary to reformat the data content delivered to the wireless device at the proxy service. This will generally be dependent on the particular wireless protocol used, and what services are provided by the service provider for the wireless client.

Currently, in the United States, wireless clients generally access Internet 24 by using the Wireless Application Protocol (WAP). In Japan, the most popular access means is NTT DoCoMo's i-Mode wireless protocol. In addition to these wireless standards, new standards are anticipated to be in force in the near future, including NTT DoCoMo's FOMA (Freedom of Mobile Multimedia Access), which is transported over W-CDMA (Wideband Code Division Multiple Access), and CDMA-2000. For the purposes of the invention herein, it will be understood that those skilled in the mobile telecommunications arts will be knowledgeable about any particular format and/or transport protocol requirements that pertain to the particular protocol that is to be used.

A second exemplary system infrastructure 10B for implementing the invention is shown in FIG. 1B. As will be readily recognized, much of infrastructure 10B is similar to infrastructure 10A; however, rather than have a separate proxy server perform the proxy functions (retrieve and translate content), these functions are performed on machines operated by the web site in infrastructure 10B.

The logic implemented by the invention when providing content to a client using infrastructure 10B is illustrated in the flowchart of FIG. 2B, wherein the process begins in a block 101 in which the client sends a content request 39 directly to the network site (e.g., web server 26), as depicted by a transfer path 41. In a block 103, HTTP negotiations are performed to determine the format the content is to be delivered in. For example, the request may contain indicia identifying the type of content requested, such as an SVF MIME type (e.g., image/vnd.svf). This is to inform the web server that the request is for specially-formatted content rather than conventional content. The server first checks to see if it already has cached the requested content. If it has, it sends the content to the requesting client; otherwise, it retrieves the parent HTML document in a block 107. It then performs processing steps in blocks 107, 109, and 111 to retrieve content referenced through embedded tags in a manner substantially similar to that discussed above with reference to respective blocks 106, 108, and 110. The primary difference in this instance is that the web server does not receive requests from or send documents to a proxy server—rather, the content is retrieved and processed at the web server, wherein the retrieved content may be stored local to the web server or retrieved from a remote server in a manner similar to that described above.

As before, the retrieved HTML documents are translated into scalable vector representations by HTML translator 58 in a block 114, while the graphic images are translated into a compressed bitmap format by image translator 60 in a block 116, as depicted by vectorized content 62 and bitmap content 64. The vectorized content and bitmap content are then streamed from the web server to the client in a block 119, as depicted by a transfer path 67. Upon arriving at the client, the vectorized content and bitmap content are processed, scaled, and rendered on the client in a block 120.

A third exemplary system infrastructure 10C for implementing the invention is shown in FIG. 1C. In this configuration, the proxy functions are performed at the client. As shown by a block 113 in FIG. 2C, the process for providing vectorized content to a client in accordance with infrastructure 10C begins in a block 113, in which the client sends a content request 37 to a network site, such as web server 26, via Internet 24. In response, the network site retrieves the parent HTML document and sends it to the requesting client in a block 115. In a manner similar to that discussed above with reference to blocks 106, 108, and 110 of FIG. 1A, the client first parses the parent HTML document searching for embedded references to external objects and retrieves these objects, whereupon the embedded reference search is performed on the newly retrieved document until all of the content corresponding to the original content request has been retrieved.

This content is depicted by HTML documents 52 and image files 54, which are sent from the network site to the client via a transfer path 69. At this point, the client performs translations on the HTML content and the graphic image content that are substantially similar to that performed by the proxy server in FIG. 1A or at the web site in FIG. 1B, as provided by blocks 114 and 116. The vectorized and image content is then processed and scaled by thin client 68 in a block 120, as depicted by device output 71.

Attention now is focused on the functionality provided by proxy server 24 in system infrastructure 10A of FIG. 1. Fundamentally, the proxy server functions as a proxy. It accepts requests for content from client devices as full URLs using standard HTTP mechanisms carried over a multiplexed TCP connection. Standard HTTP content negotiations features specify the formats in which content is to be delivered (SVF, bitmap, and possibly others, which can be handed off to cooperating client-side display software). As described in further details below, in some embodiments the proxy server appears for the client as a normal proxy (that is, the client knows it is retrieving content via the proxy), while in other embodiments the proxy is transparent to the client.

The proxy server responds to client content requests by delivering content in one of the requested formats, by retrieving the content in an appropriate format from its cache, or from an upstream content source (again using standard HTTP content negotiation features), or by translating upstream content from a supported original format to SVF or the client bitmap format.

Requests from the server installation to its cache and from the cache to upstream content sources are made in HTTP carried over TCP using simple straightforward Web content requests. For example, requests from clients to the proxy server comprise HTTP proxy requests (e.g., "GET http://www/xyz.com/some_page.html HTTP/1.0 . . . ") carried over TCP or over a lightweight multiplexing protocol over TCP. The multiplexing protocol allows the server to push image thumbnails to the client before the SVF stream is available, as well as offering a channel for control and status information, more simultaneous channels than the client operating system may support, and a mechanism for prioritizing information flow from server to client under loose client control. In addition to HTTP requests, the proxy server architecture supports other user-level protocols, such as FTP and Gopher.

Figure 3:
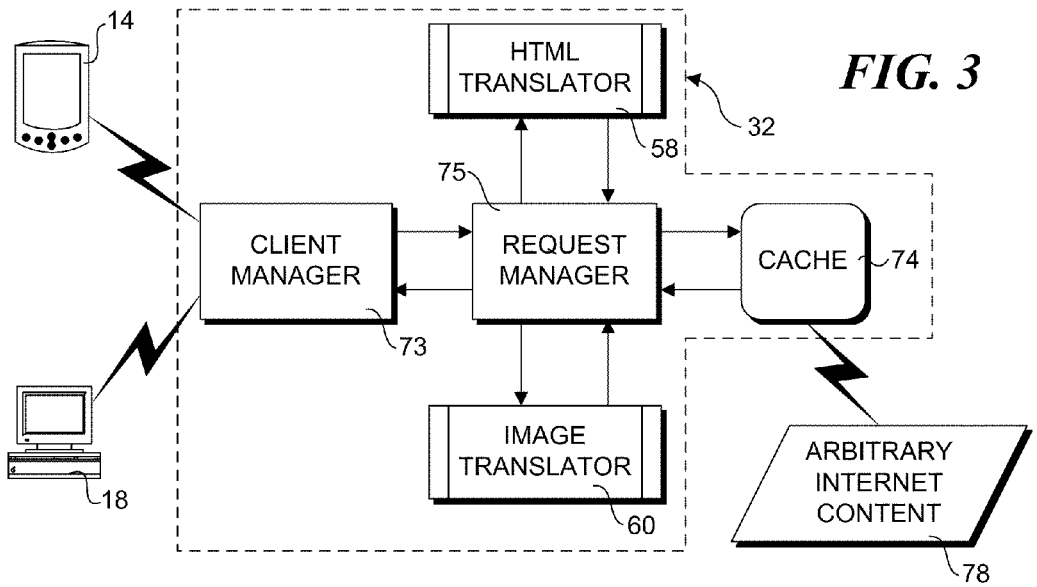
FIG. 3 is a block schematic diagram illustrating an exemplary architecture corresponding to the proxy server of FIG. 1A.

Details of some of the primary components of the proxy server architecture are shown in FIG. 3. Internally, the proxy server comprises a suite of coordinated processes connecting to upstream content through an HTTP cache 74. In one embodiment all functions except caching are performed in a single process, wherein multiple threads are used to effect asynchronous I/O. Separate processes communicated via persistent multiplexed connections carried over the most efficient reliable transport available (e.g., Unix sockets over single processor and symmetric multiprocessor (SMP) computers; TCP sockets between separate computers). All processes are capable of servicing multiple requests simultaneously. No process maintains client state outside the context of a single request, so all components can be repeated and load balanced across multiple CPU's of an SMP computer or across separate computers on a LAN.

The various content translators used by the proxy server accept (via HTTP PUT) or request (driven by HTTP proxy GET/POST) content in supported, but client-unsupported, formats; and return (via HTTP PUT or GET/POST response) one or more representations of that content in a client-supported format. In the embodiments illustrated in FIG. 1A-C, two translators are used: HTML translator 58 and image translator 60. Future content types may be accommodated by new translators, by extending existing translators to cover the new content types, or by extending the client's capabilities. Standard HTTP content negotiation mechanisms are used to inform the proxy server of the client's capabilities and expectations on each request.

Managers at the proxy server coordinate the operations of other components. Two managers are presently defined; a client manager 73 that handles client proxy requests, and a request manager 75 that handles unproxied HTTP requests from other services. The managers accept requests, attempt to service them from HTTP cache 74, and drive HTML translator 58 and image translator 60 when content does not match the clients' requirements. Managers also handle translator requests for inline content (e.g., image dimensions for page layout), and push translated content into HTTP cache 74. Additionally, the client manager coordinates delivery of primary and inlined content, and provides process and status information to the clients.

As discussed above, HTML translator 58 creates a scalable vector representation of the original HTML content of a requested web page. In order to better explain how translation of HTML content is performed, one embodiment of a translation process is described below as applied to an exemplary web page. In addition, details of conventional web page client and server-side processing are provided so as to clarify how web content is laid out during a pre-rendering process on the client.

FIG. 4 shows a representation of a web page 210 served from an exemplary stock brokerage Internet web site as it would appear when rendered on a modern Internet browser, such as Microsoft's Internet Explorer or Netscape's Navigator. Web page 210 is exemplary of many web pages that implement frames, and includes two adjacent frames 212 and 214. A logo graphic object 216A is displayed at the top of frame 212, which additionally includes a "MARKETS" text header 218A, an "INVESTMENTS" text header 220A, and a plurality of links with overlaying graphic objects, including a "DOW" link 222A, a "NASDAQ" link 224A, an "OPTIONS" link 226A, a "CHARTS" link 228A, a "MUTUAL FUNDS" link 230A, a "IRA, 401K OPTIONS" link 232A, and a "TAX INFORMATION" link 234.

A horizontal group of links 236 is disposed at the top of frame 214, and includes a "QUOTES" link 238A, a "HOT PICKS" link 240A, a "CALENDARS" link 242A, and a "NEWS" link 244A. An advertisement banner 246A is displayed just below the horizontal group of links and just above a "NEWS SPARKS MARKET" headline 248A. Frame 214 also includes a pair of graphic image objects, including a DOW chart 250A and a NASDAQ chart 252A. A set of user input objects is disposed adjacent to DOW chart 250A within a graphic object 254A, including an "ACCOUNT #" input box 255A, an "ACCESS CODE" input box 256A, and a "LOGIN" button 257A. In addition to the foregoing objects, frame 214 also includes text objects 258A and 260A.

An HTML listing corresponding to web page 210 is presented below as LISTING 1. Note that LISTING 1 sometimes refers to object descriptions and link paths rather than the text or path location of actual objects for simplicity, and that other elements commonly found in HTML pages, such as META entries, are omitted for clarity.

LISTING 1

```
1.   <html>
2.   <head><title>"MARKET HOME"</title></head>
3.
4.   <body bgcolor="#FFFFFF" link="0033CC" vlink="0033CC">
5.
6.   <frameset cols="25%,75% frameborder=0 border=0>
7.   <frame>
8.   <align=left><align=top>
9.   <img src="/directory path/logo.gif" align = left border="0" height="80" width="100">
10.     <br><br>
11.     <t3>TEXT HEADER #1 align=left</t3><br>
12.
13.     <table width="90%" border=0 cellspacing=10 cellpadding=0 bgcolor="#000000"
14.     align=center>
15.       <tr>
16.         <a href="URL or path for LINK #5" <img src="/directory
17.         path/GRAPHIC#2" height="50" width ="150"></a>
18.       <tr>
19.         <a href="URL or path for LINK #6" <img src="/directory
20.         path/GRAPHIC#3" height="50" width ="150"></a>
21.       <tr>
22.         <a href="URL or path for LINK #7" <img src="/directory
23.         path/GRAPHIC#4" height="50" width ="150"></a>
24.       <tr>
25.         <a href="URL or path for LINK #8" <img src="/directory
26.         path/GRAPHIC#5" height="50" width ="150"></a>
27.     </table>
28.     <br>
29.       <t3>TEXT HEADER #1 align=left</t3>
30.     <br>
31.     <table width="90%" border=0 cellspacing=10 cellpadding=0 bgcolor="#000000"
32.     align=center>
33.       <tr>
34.         <a href="URL or path for LINK #9" <img src="/directory
35.         path/GRAPHIC#6" height="50" width ="150"></a>
36.       <tr>
37.         <a href="URL or path for LINK #10" <img src="/directory
38.         path/GRAPHIC#7" height="50" width ="150"></a>
39.       <tr>
40.         <a href="URL or path for LINK #11" <img src="/directory
41.         path/GRAPHIC#8" height="50" width ="150"></a>
42.
43.     </table>
44.     </frame>
45.
46.     <frame>
47.
48.     <table>
49.       <tr>
50.         <table width="100%" border=0 cellspacing=15 cellpadding=0
51.         bgcolor="#000000" align=center>
52.         <tr>
53.         <td><a href="URL or path for link#1"> alt="QUOTES"</a>
54.         <td><a href="URL or path for link#2"> alt="HOT PICKS"</a>
55.         <td><a href="URL or path for link#3> alt="CALENDERS"</a>
56.         <td><a href="URL or path for link#4>alt="NEWS"</a>
57.     </table><br>
58.         <br>
59.         <img src="URL for GRAPHIC #9" align=center
60.         border="0" height="80" width="325">
61.     <br><t1>HEADLINE TEXT>/t1>
62.     <table>
63.       <Colgroup span="2">
64.       <Col width = "400" align="center">
65.       <Col width = "200" align="center">
66.       <tr><td>
67.         <img src="/directory path/GRAPHIC #10" align = center
68.         border="0" height="180" width="350">
69.       <td>
70.   /* INPUT FOR ACCOUNT NUMBER AND ACCESS CODE */
71.     <SCRIPT LANGUAGE ="Javascript">
72.     <!---
73.         [Javascript variable declarations]
74.         [Javascript functions to enable login] ---!>
75.     </SCRIPT>
76.     <table>
77.       <td>
```

LISTING 1

```
78.         <img src="/directory path/GRAPHIC #11" align = center>
79.         <table width="150" height="25">
80.         <td>
81.         <font size=-2 face="arial,helvetica,verdana">Account #</font>
82.         <tr><input type=text name="USERID" maxlength=9 size=20>
83.         <tr><font size=-2 face="arial, helvetica">Access Code:</font>
84.         <tr><input type=password name="PASSWORD" maxlength=10 size=20
85.             onKeyDown="SuppressEnterBell(event)"
86.             onKeyPress="SuppressEnterBell(event)"
87.             onKeyUp="SubmitOnEnter(event)">
88.         <br> 
89.         <br><input type="button" value="Login"
90.         OnClick="ProcessForm( )">  <input type="reset">
91.         <br> 
92.         </td>
93.         </table>
94.       </table>
95.     <tr>
96.         <img src="/directory path/GRAPHIC #12" border="0
97.         height="200" width="350">
98.     <tr>
99.             <p>TEXT FOR TEXT OBJECT #1</p><br>
100.            <p>TEXT FOR TEXT OBJECT #2</p>
101.        </table>
102.    </frame>
103.  </frameset>
104. </html>
```

Web page documents comprise HTML code that is parsed, interpreted, and rendered by a browser. An HTML document comprises a plurality of HTML "markup" elements (tags) with corresponding attributes, that are used to describe the layout and formatting of various objects, including plain text and graphic objects, embedded between tag pairs. Exemplary elements include text tags (e.g., <b></b> for bolding text), links (e.g., <a href="URL"></a>), formatting (e.g., <p></p> for creating a new paragraph, graphical (e.g., <img src="name">), wherein "name" defines an absolute or relative location at where an image is stored, tables (e.g., <table></table>) creates a table, and forms (e.g., <form></form> creates all forms).

As of Netscape Navigator 3.0 (and other later browsers), web pages could include frames. When using frames, the display page is divided into multiple framed areas. Framing enables a single display page to include source code from several HTML documents (one for each frame) or optionally, enables a single document to include more complicated grouping of contents whereby different content groups are contained in separate frames. Frames are commonly found on the web pages at sites that display a great deal of text and graphical content, such as MSN.com, ESPN.com, and USAToday.com.

Figure 5:
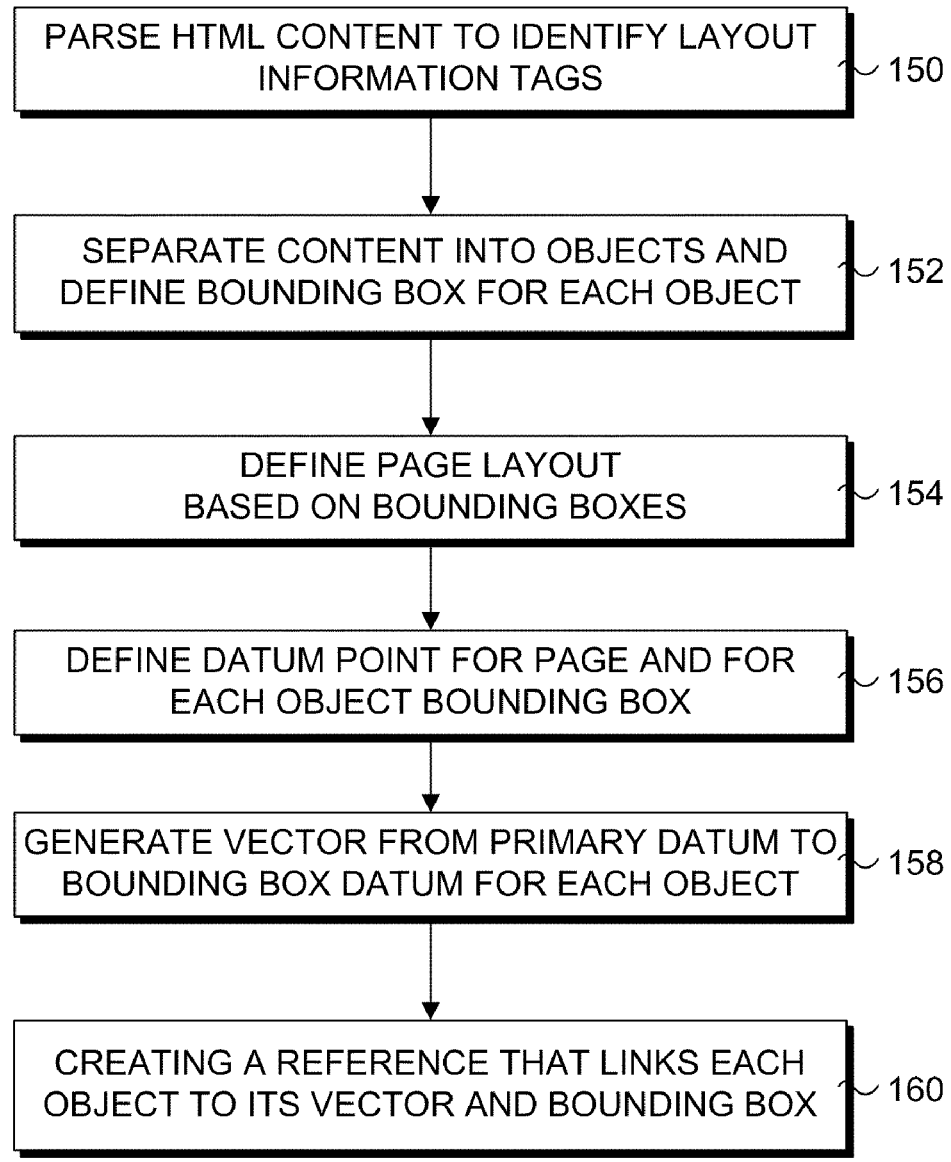
FIG. 5 is a flowchart illustrating the logic used by the invention when translating content into a scalable vector representation of that content.

With reference to the flowchart of FIG. 5, the process for translating the HTML content into a scalable vector representation proceeds as follows. The process is initiated when the proxy server receives the HTML corresponding to the parent document (and frame documents, if appropriate), whereupon a pre-rendering parsing of the HTML is performed to determine where to place the various objects on the display page in a block 150. For example, elements such as tables, column definitions, graphic images, paragraphs and line breaks are identified. If frames are included, each frame is examined in the sequential order it appears in the HTML document, or the order in which the HTML documents corresponding to the frames in a frameset are downloaded to the browser. During further processing, the actual objects are rendered in their respective positions. Some of these objects are rendered almost immediately, such as plain text, while other objects, such as graphic objects, must first be retrieved prior to being fully-rendered. With respect to tables, there are some instances in which all of the objects corresponding to the cells in the table must be retrieved prior to rendering any of the table, while a well-designed table can be rendered incrementally. For example, by using Column grouping, the format of the corresponding table can be quickly determined by the browser. In some instances, one or more bitmaps may actually need to be fetched before the page layout can be determined.

Next, in a block 152, the content is separated into objects based on logical groupings of content portions and a page layout is built using bounding boxes that are produced for each object. As the primary HTML document is parsed, logical groupings of content will emerge. For instance, text content contained within paragraph tags <p></p> forms a logical grouping of text content. In essence, a logical grouping means the content should appear together as a logical group, such as within a substantially rectangular outline, in the rendered page. Other logical groupings include frames, table content, row content, single line entries such as headlines and headers, and user-interface objects, as well as graphic layout objects, such as separator bars, and graphic images. In addition to logically grouping content into objects, a "bounding box" is defined for each object. In general, the bounding box defines an outlined shape within which the content (text or graphic image) will appear. In most instances, the bounding box will be substantially rectangular in shape. However, bounding boxes comprising more complex shapes may also be produced.

In further detail, the following explains how objects corresponding to graphic images are produced. In HTML, objects comprising graphic content are identified by an <img src="/local directory path/graphic image file" (for a local graphic image) or "URL" (for a remote graphic image)> or <object> or other tags. In the foregoing tag, local graphic images are typically stored on the same server as the web page, or another computer that is local to the site's server, and generally are located through a local directory path (absolute or relative to the location of the present page) that points to the graphic image file. Remote images are those images that are stored on servers at sites that are remote to the web server. For example, with reference to LISTING 1, when the parser encounters line 9, the browser identifies that data comprising a graphic image corresponding to logo graphic object 1 will be arriving (or may have already been received), and the displayed image is to have a height of 80 pixels and a width of 100 pixels. The location of each object on a display page will be dependent on previous HTML layout elements, such as tables, paragraphs, line breaks, and other graphic objects. The size and location of the other graphic objects (i.e., graphic objects #2-12) on the page are determined in a similar manner. The HTML code for these objects are shown in lines 16, 19, 22, 25, 34, 37, 40, 59, 67, 78 and 96, respectively. As identified in the HTML code, data corresponding to graphic objects #9 (advertisement banner 46A) is forwarded to the browser from an external site (as indicated by the URL to GRAPHIC #9), while graphic objects 1-8 and 10-12 are sent from the web site the parent HTML document is sent from.

In a similar manner, the foregoing technique is applied to the HTML code in the primary document to identify other types of objects as well. In addition to parsing the primary HTML document, similar processing is performed on referenced documents, such as documents that include frame content that is defined and stored separate from the primary HTML document.

Figure 4A:
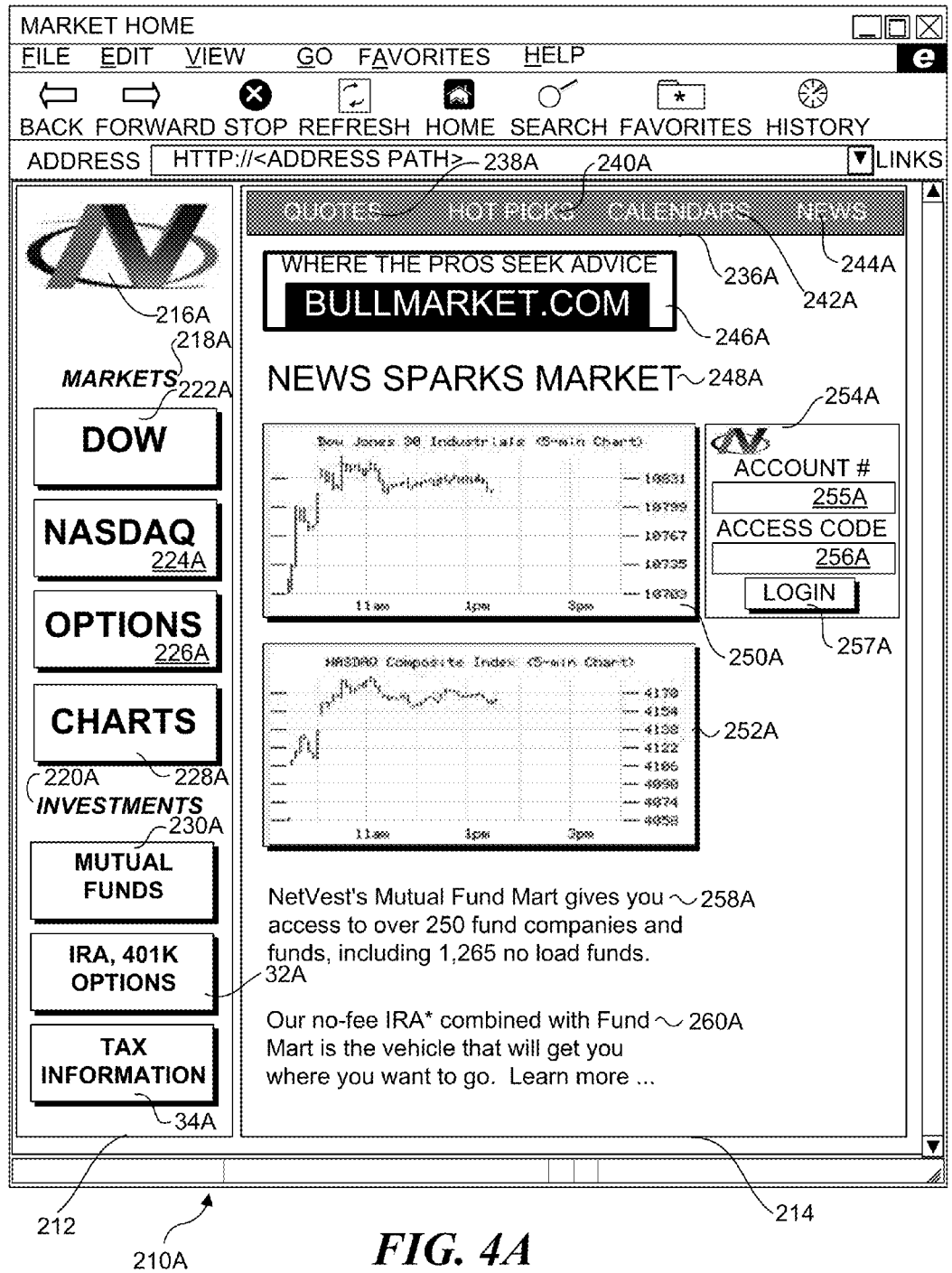
FIG. 4A is a representation of an exemplary web page has displayed on a conventional browser.
Figure 4B:
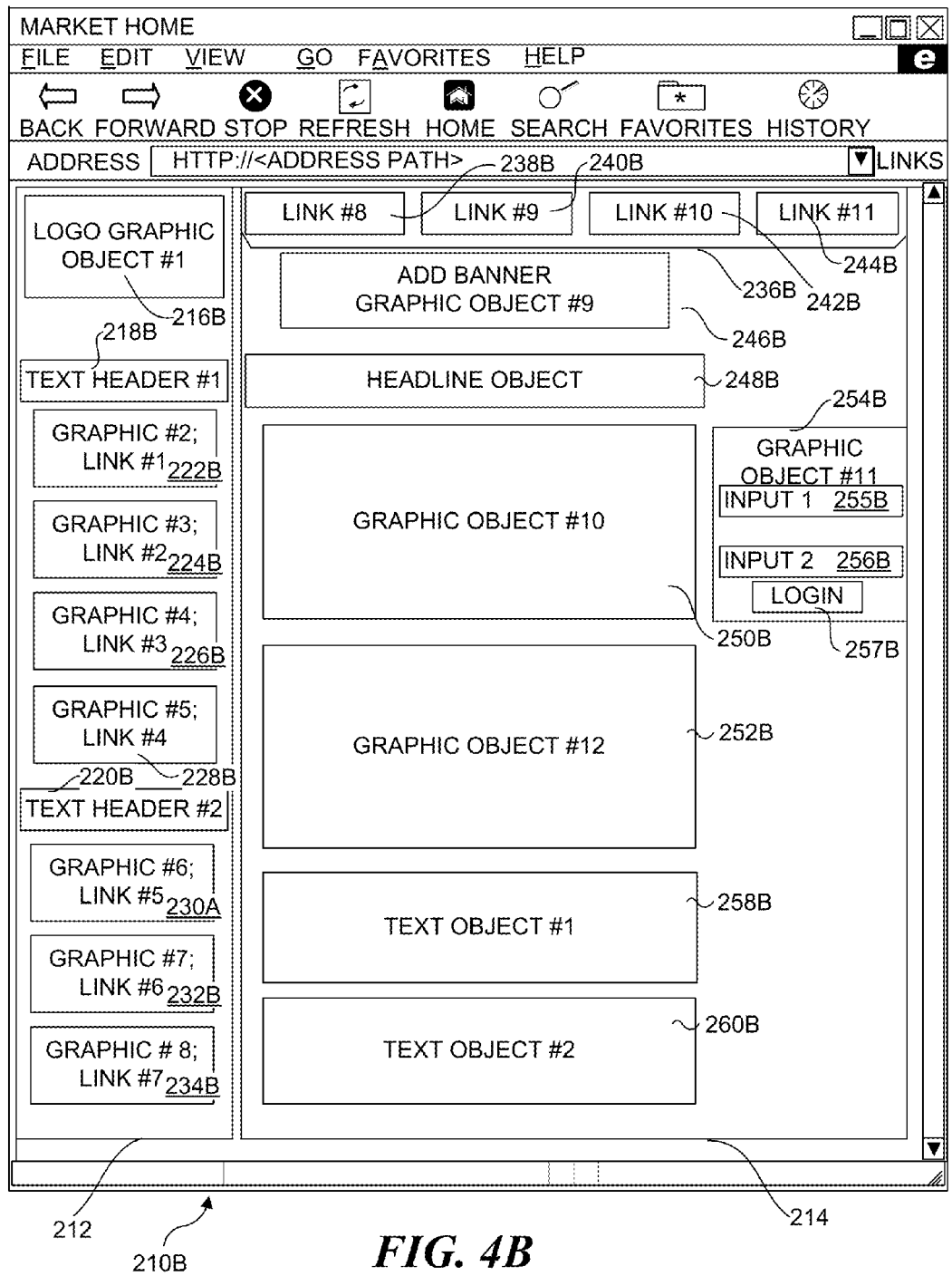
FIG. 4B is a schematic diagram illustrates various objects that are generated based on the HTML code of the web page of FIG. 4A.

A representation of the results of the functions performed in block 152 are shown in FIG. 4B. In the Figure, objects corresponding to the original content of FIG. 4A are shown with an appended "B" that is added to each object's root reference number, wherein the root reference number for an object is that same as the logically grouped content in FIG. 4A that it corresponds to, e.g., an object 248B is generated for "NEWS SPARKS MARKET" headline 248A, etc.

Next, in a block 154, the page layout is defined based on the bounding boxes. In actuality, generation of the page layout information is performed in conjunction with defining the boundary boxes for the objects, wherein the location of a given object is based on the location of other related (e.g., if within a table) or non-related objects corresponding to HTML content that have been previously parsed. For example, the location of a given paragraph will depend on the other content for the page that are listed prior to the definition for the paragraph in the primary HTML document or referenced document, if applicable. As the HTML content of the primary and any referenced HTML documents are parsed, the page layout is generated based on the various HTML tags and the content embedded between tag pairs and/or referenced by a tag pair statement (e.g., graphic images).

As will be recognized by those skilled in the art, the functions performed in blocks 150, 152, and 154 are commonly performed by conventional browsers during a pre-rendering process. In some browsers, these functions are performed by the Mozilla rendering engine, which comprises open source software that is readily available for use by developers. At present, the software for the Mozilla rendering engine may be accessed via the Internet at www.mozilla.org. Accordingly, in one embodiment, the present invention uses core functionality provided by the Mozilla rendering engine source code to perform the functions of block 150, 152, and 154.

Figure 4C:
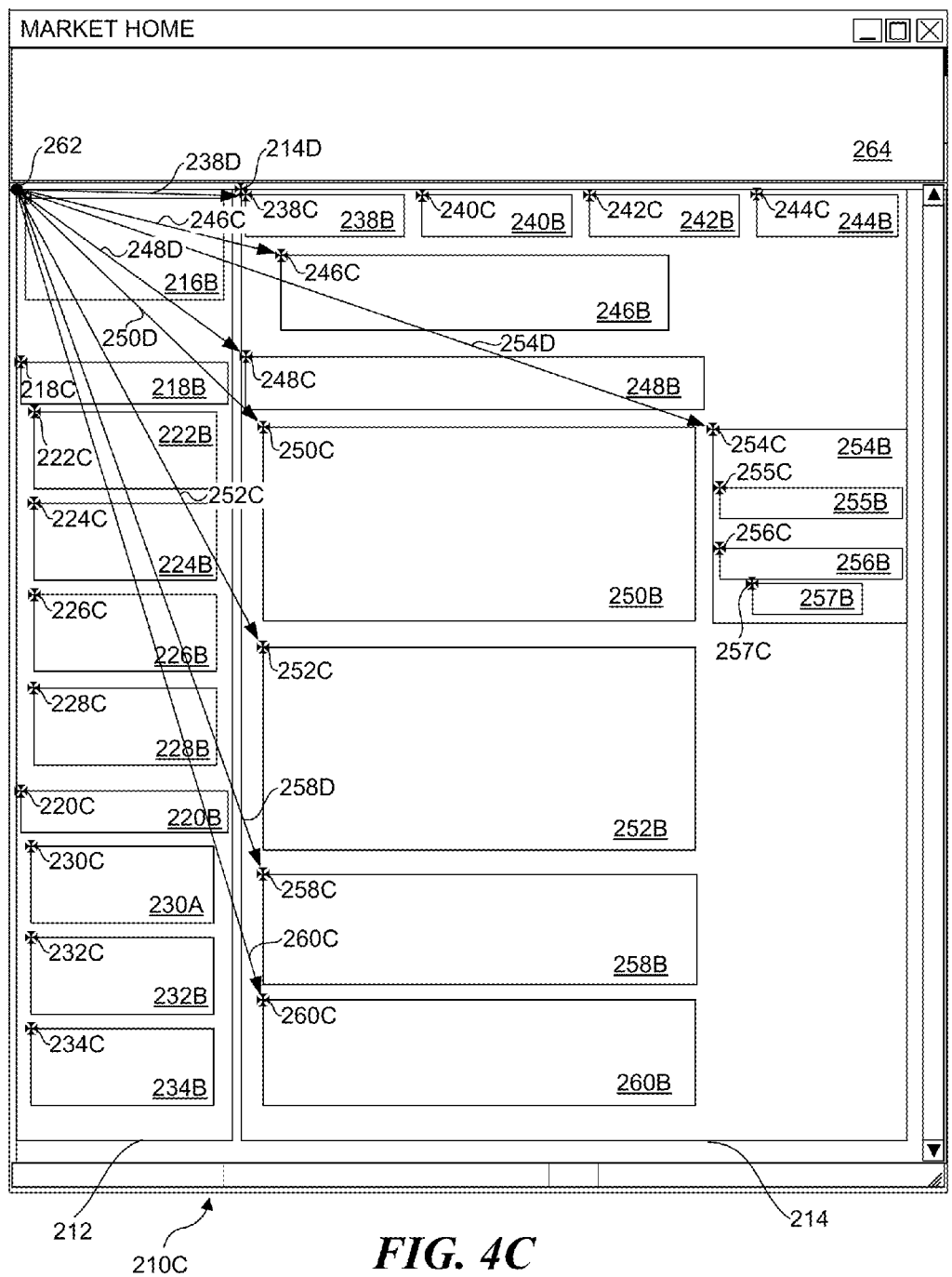
FIG. 4C is a schematic diagram illustrating a set of vectors and bounding boxes corresponding to the objects generated in FIG. 4B.

At this point, the present invention deviates substantially from the prior art by using the various object layout data generated during the pre-rendering process to generate a scalable vector representation of the original page content. First, in a block 156, a datum point is defined for the page and the bounding box for each object. For example, as shown in FIG. 4C, a rendered page datum 262 is defined to be coincident with the upper left hand corner of the display frame of the rendered page for the web page. Generally, any point on the page may be used as the page datum—the only requirement is that the page datum that is selected is used consistently throughout the process. The use of the upper left hand corner of the display frame is advantageous since the location of the first object encountered in the HTML code for a page is located relative to this corner.

In general, the datum points for each object may also be located any place on the object, as long as the object datum points are used in a predictable manner. For example, as depicted in FIG. 4C, various datum points for corresponding objects are defined to be coincident with the upper left hand corner of the bounding box for that object, wherein the object's datum point shares the root reference number of the object with an appended "C."

Figure 4D:
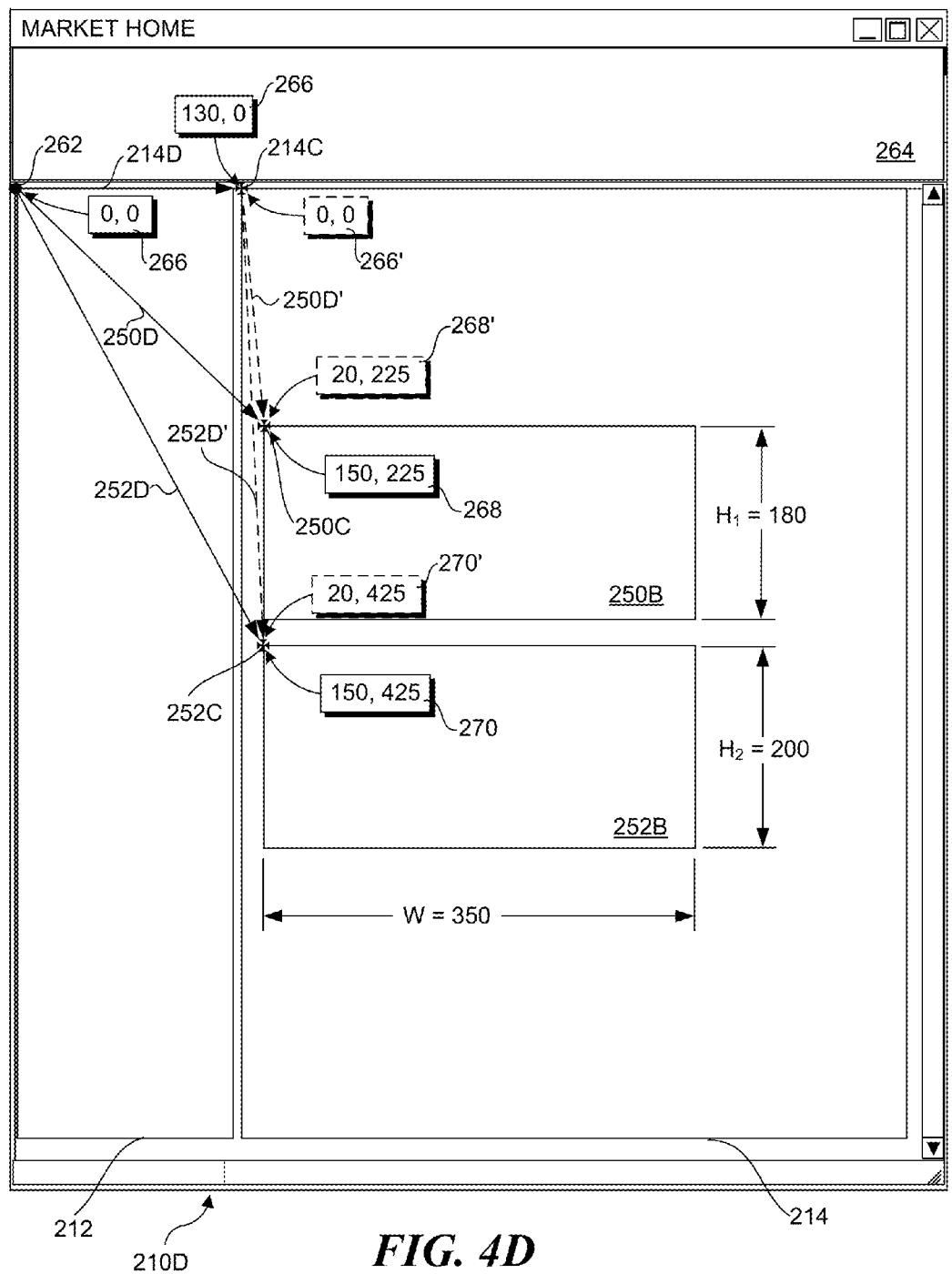
FIG. 4D is a schematic diagram illustrating how various vectors and bounding boxes may be defined in accordance with the invention.

Once the page's datum point and an object's datum point are known, a vector between these points is generated for each object in a block 158. With reference to FIG. 4D, in one embodiment, wherein the page datum point corresponds to the upper left and corner of the display frame and is assigned an XY value 266 of 0.0, the vector for a given object may be stored as the XY value of the datum point of that object relative to 0.0, such as a value of 150, 225 (ref. num. 268) for a vector 250D pointing to an object datum 250C, and a value of 150, 425 (ref. num. 270) for a vector 252D pointing to an object datum 252C. In another embodiment, each vector may be stored as XY data relative to a 0.0 datum point corresponding to the upper left hand corner of the frame the object belongs to. For example, a vector 250D' from a frame datum 214D to object datum 250C is stored as 20, 200 (ref. num. 268'), while a vector 252D from frame datum 214D to object datum 252C is stored as 20, 425. In this embodiment, offset information for each frame relative to a known datum will also be stored, as depicted by a vector 214D.

The scalable vector representation is completed in a block 160, wherein a reference is created for each object that includes or links an object's content and attributes, such as object type (e.g., text, image), object typeface, and boundary box parameters, to the object's vector. For example, object 250B is a graphic image having a vector 250D and a bounding box that is 180 pixels high and 350 pixels wide, while object 252B is a graphic image having a vector 252D and a bounding box that includes a height of 200 pixels and a width of 350 pixels. This enables client-side operations to be performed that only initially consider the vectors, wherein if it is determined that a vector's endpoint (and/or the bounding box corresponding to the object the vector points to) would appear off of a display, there is no need to retrieve the content and attribute data linked to the vector. This concept is explained in further detail in the following section.

It is noted that a portion of the display content produced on a client device will never contain any rendered content, as this portion is reserved for the browser's user interface. In WINDOWS™ environments, this portion will include the browser's window frame, as well as the pulldown and icon menus provided in the browser's user interface, which are depicted by a box 264 in the Figures herein.

Client-Side Software and Processing

As discussed above, the present invention supports a wide variety of clients, including land-based clients and wireless clients. Each client requires some client-side software that enables the scalable vector content data provided to it to be rendered at a user-selectable scale factor and offset on the client's display, such as a monitor or built-in LCD screen.

By enabling original content from a web site to be displayed in such a resolution-independent manner, users will be able to view content in a manner that did not previously exist, greatly enhancing the user experience. For example, in some implementations the client may be a personal computer (PC). Using a least-common denominator approach, many web pages are designed for a smaller resolution (for example 640×480 pixels, a minimum resolution commonly supported by nearly all PC's, including legacy PC's) than the resolution provided by the video output capabilities available with many of today's PC's, such as 1024×768 pixels, 1280×1024 pixels, and even 1600×1200 pixels. As a result, when these web pages are displayed on a high-resolution display, they occupy only a portion of the display, making portions of the pages, especially those portions containing small text, difficult to read. By enabling users to selectively magnify the entire page, these design flaws are easily overcome. Alternatively, the client may be a small device, such as a hand held computer or a cell phone, which has a smaller display resolution than common Web pages are designed for. As explained below, through use of the invention's scalable vector representation and client-side processing, users are enabled to view the entire content of billions of existing Web pages using handheld devices in a simple and reasonable way.

In one embodiment, the client software may be a plug-in to a Web browser, such as Netscape Navigator or Microsoft Internet Explorer. Such a plug-in might have the browser download the data and display it in a sub-window of the browser. Alternatively, the client software may be a Java applet running in a browser. As another option, the client software may be a stand-alone program that interfaces with the proxy server or proxy software directly. The client software may bypass the proxy when requesting information that won't be translated to vectors, such as bitmaps.

Figure 4E:
FIG. 4E is a representation of the web page of FIG. 4A after it has been offset and scaled in accordance with the invention.
Figure 6:
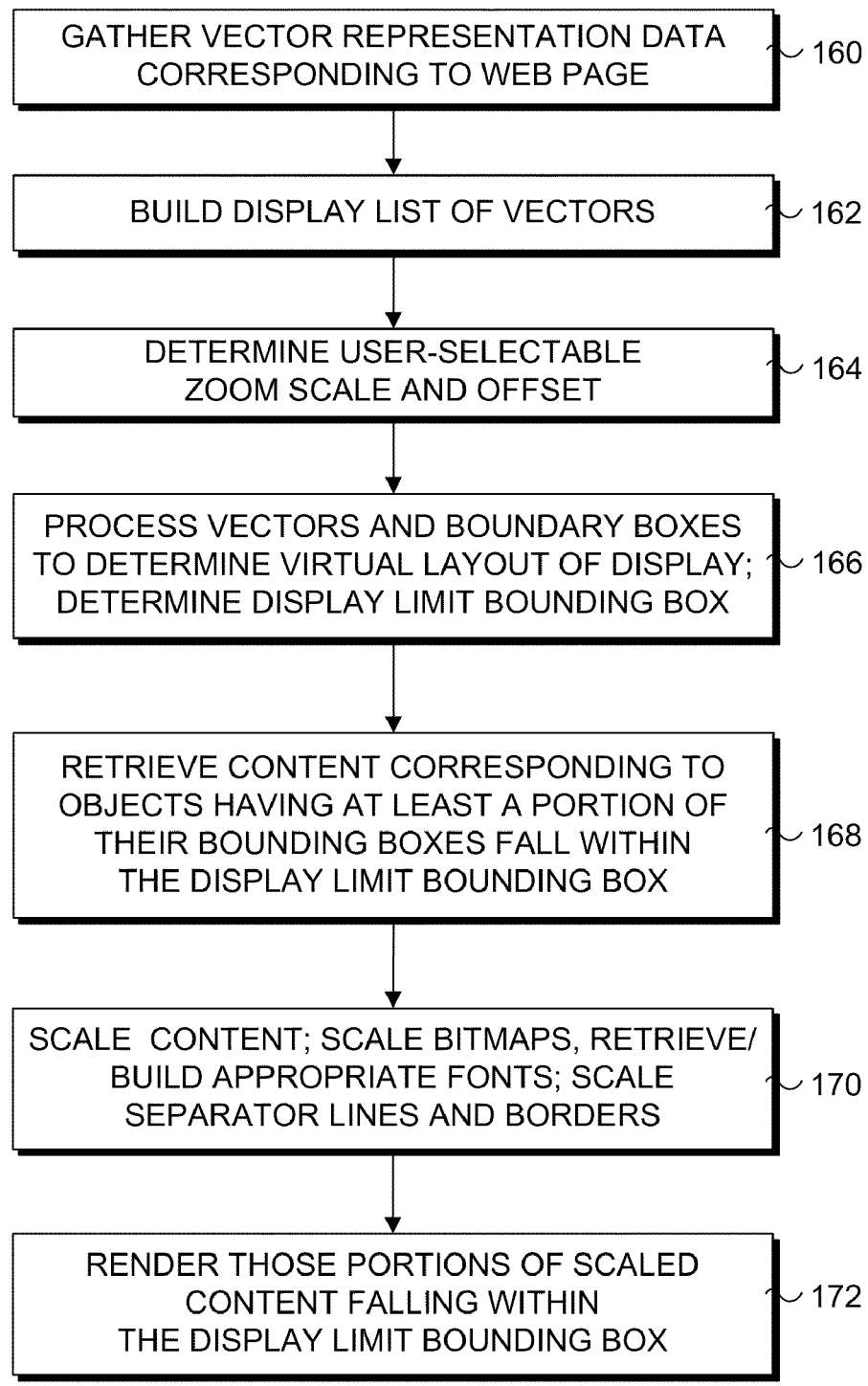
FIG. 6 is a flowchart illustrating client-side operations that are performed to create a rendered display page based on the translated content the client receives and user-input.

With reference to FIG. 6, client-side processing proceeds in the following manner. In a block 160, the vector representation data (i.e., vectorized HTML content and compressed bitmap content) for the web page is gathered at the client. Typically, this data will be stored in a cache at the client as it is being received, and the client simply retrieved the data from the cache. In a block 162, a display list of vectors is built. This process is well known in the CAD arts, and is enabling rapid zooming of vector-based objects. In a block 164, user selectable scale and offset (pan) values are determined. Based on various user interactions with the user-interface of the client, the user is enabled to control the zoom (size) and offset of the rendered page. For example, suppose the user provides zoom and offset inputs to produce a rendered page 210E, as shown in FIG. 4E. In this rendered page, the original origin is now off of the screen (the page image is shifted upward and toward the left—see FIG. 4F), and the view has been scaled approximately 1.3 times.

Figure 4F:
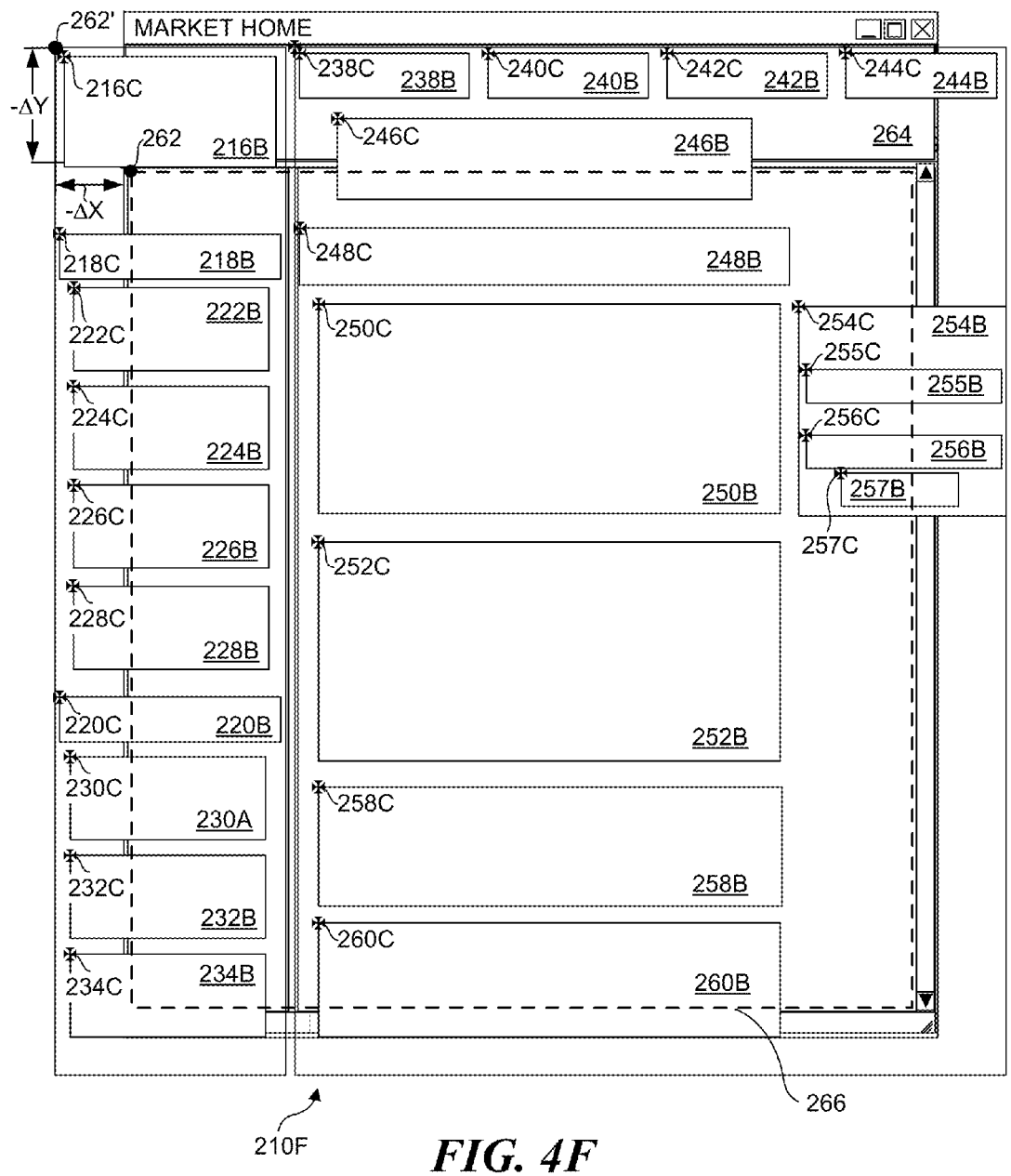
FIG. 4F is a schematic diagram illustrating new datum points and bounding boxes corresponding to the scaled and offset web page.
Figure 4G:
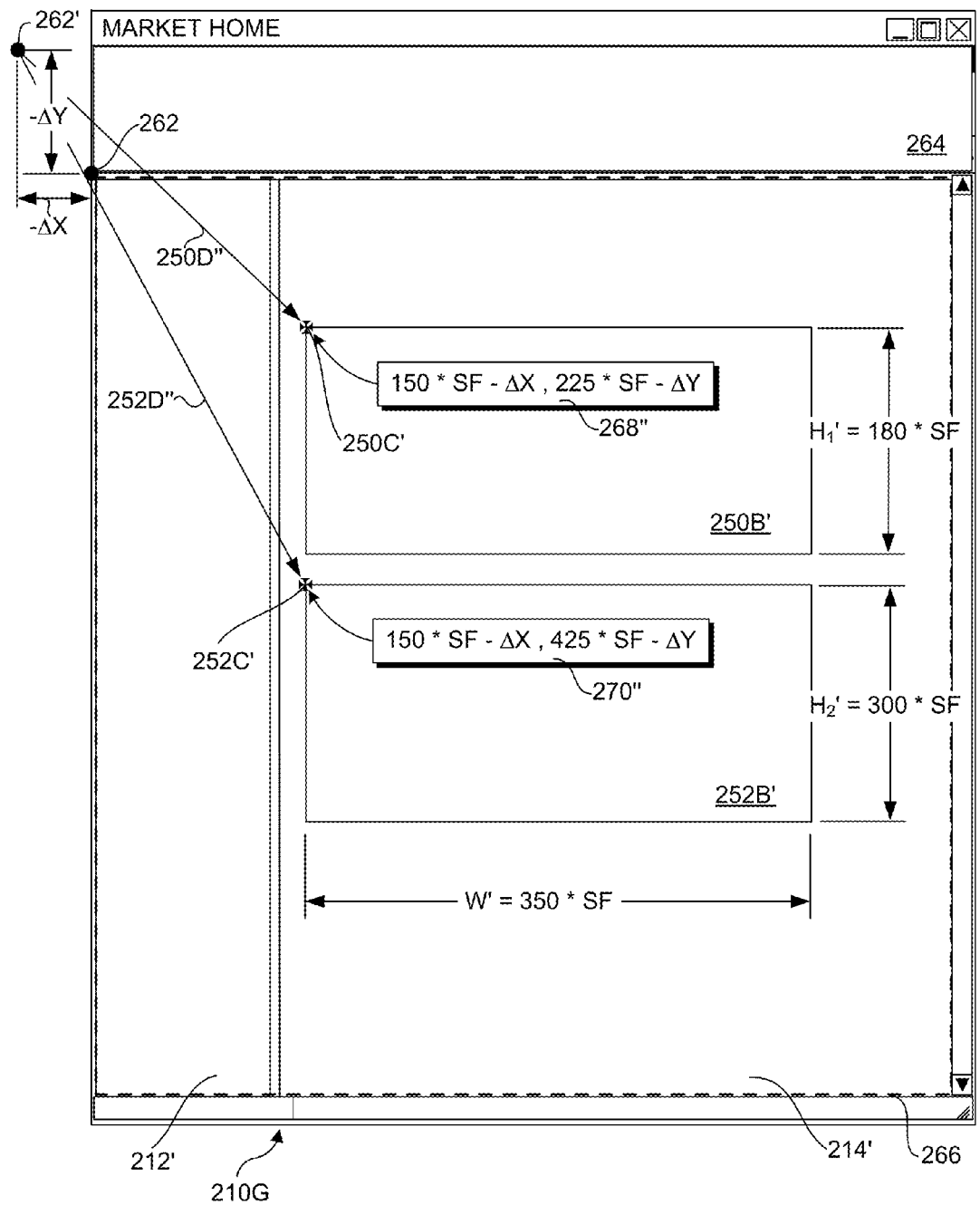
FIG. 4G is a schematic diagram illustrating new vectors and bounding box parameters for a pair of objects in the scaled and offset web page.

Next, in a block 166, the vectors and boundary boxes are processed based on the scale and offset, and a bounding box defining the limits of the display content is determined. The results of this step are shown in FIG. 4F, while FIG. 4G shows specific details on how the vectors and bounding boxes corresponding to image objects 250B and 252B (now 250B' and 252B', respectively) are processed. Logically, there are generally two ways to scale and offset the rendered content. In one embodiment, vectors and bounding boxes are mapped to a virtual display area in memory that has much greater resolution (e.g., 100,000×100,000 pixels) than any real display, and a virtual display limit bounding box is scaled and moved around over the virtual display area. Accordingly, during subsequent processing described below, objects falling within the display bounding box are rendered by reducing the scaling of those objects in the virtual display to how the objects will appear on the client device display relative to the virtual display bounding box. In the alternate, a fixed reference frame corresponding to the display resolution of the client device screen is maintained, wherein all vectors and bounding boxes are scaled and offset relative to the fixed reference frame. Each scheme has its advantages and disadvantages. One advantage of the second method is that the display bounding box is always maintained to have a size that matches the resolution of the content display area on the client device.

As shown in FIG. 4G, respective offsets in X and Y, ($-\Delta X$ and $-\Delta Y$ in the Figure) are applied to the starting point of each of the vectors. The vectors are then scaled by a scale factor "SF." The results of the new vectors are depicted by vectors 250D" and 252D". This produces a new datum for each object's bounding box that is relative to rendered page datum 262, which remains fixed. As discussed above, only a portion of the display screen will actually be used to display content (as defined by a display limit bounding box 266 in this embodiment), while other portions of the screen, including box 264, will comprise a generally fixed-size user interface. Accordingly, rendered page datum 262 is not located at the upper left hand corner of the display area, although it possibly could be located at this point when either the current user interface is inactive (i.e., the display portion of the user interface is temporary disabled) or the user interface is contained in other portions of the display.

This foregoing process establishes a starting point (the new datum) for where the content in each object's bounding box will be rendered. At this point, each object's bounding box is then drawn from its new datum using the scaling factor. For example, in the original web page 210D (FIG. 4D), bounding box 250B had an X-axes datum of 150 pixels, a Y-axis datum of 225 pixels, and a height and width of 180×350 pixels. In contrast, after being offset and scaled, bounding box 250B' has an X-axis datum of $150*SF-\Delta X$, a Y-axis datum of $225*SF-\Delta Y$, and a height and width of $180*SF \times 350*SF$.

Returning to the flowchart of FIG. 6, once the vectors and bounding boxes are offset and scaled, content corresponding to objects having at least a portion of their bounding boxes falling within the display limit bounding box is retrieved from the client device's display list in a block 168. For examples, as shown in FIG. 4F, content corresponding to all of the objects except for those falling entirely outside of display limit bounding box 266 (objects 216, 238, 240, 242 and 244) is retrieved from the display list. That content is then scaled in a block 170. For image content, this comprises decompressing and scaling the compressed bitmaps corresponding to those images. For text content, this comprises scaling the font (i.e., typeface) that the text content portions of the web page are written in the parent HTML document and any referenced documents. There are various techniques for typeface scaling that may be implemented here, depending on the available resources provided by the operating system of the client device. For example, for WINDOWS™ operating systems, many TRUETYPE™ fonts are available, which use a common scalable definition for each font, enabling those fonts to be scaled to just about any size. In other cases, such as current PDA (e.g., Palm Pilots) operating systems, there is no existing feature that supports scaling fonts. As a result, bitmapped fonts of different font sizes and styles may be used. In addition to scaling image and text content, other types of content, such as separator lines and borders may also be scaled by block 170.

The process is completed in a block 172, wherein those portions of the scaled content falling within the display limit bounding box are rendered on the client device's display.

Figure 7A:
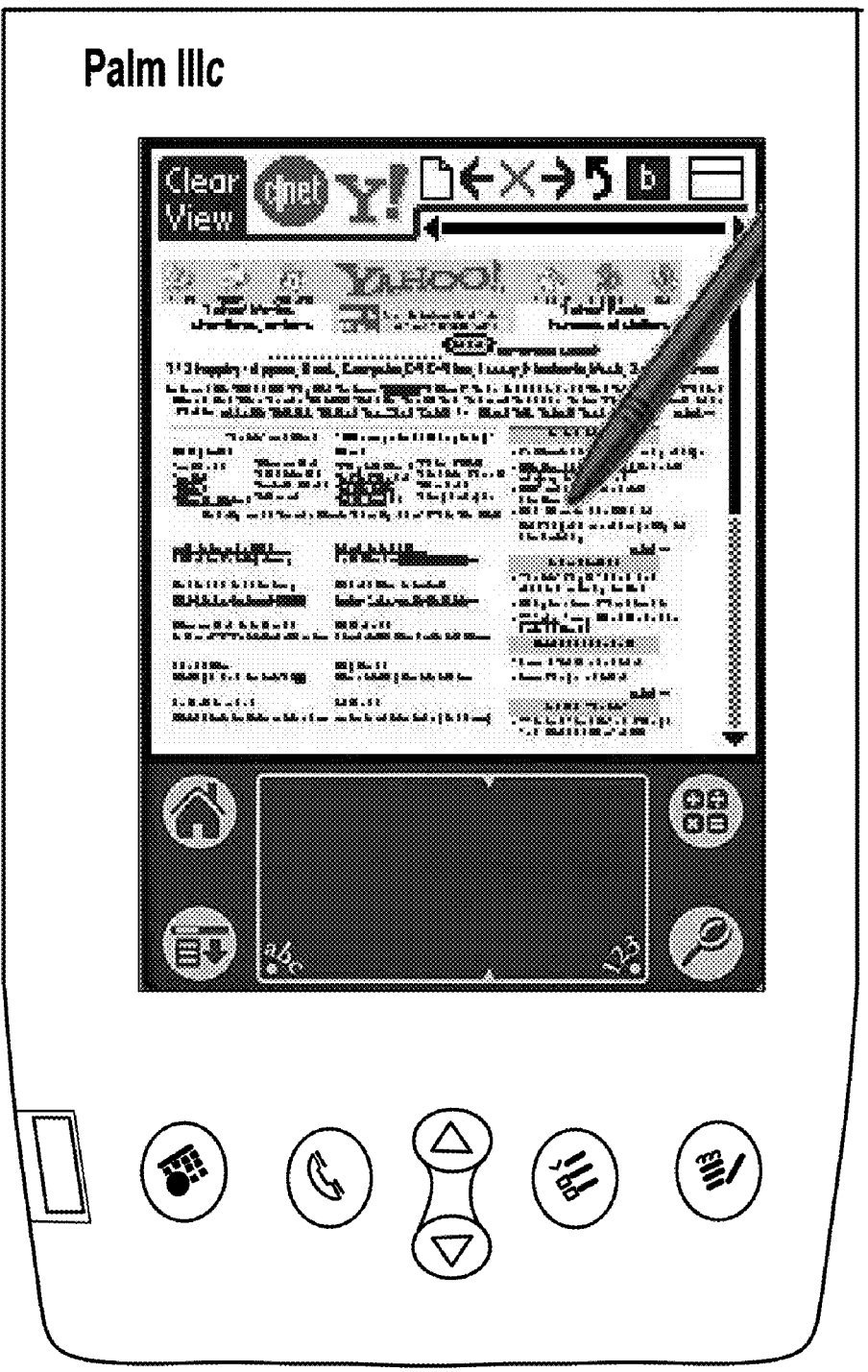
FIGS. 7A and 7B are representations of a nominal and a zoomed in column view of an exemplary web page as they might appear on a Palm device.
Figure 7B:
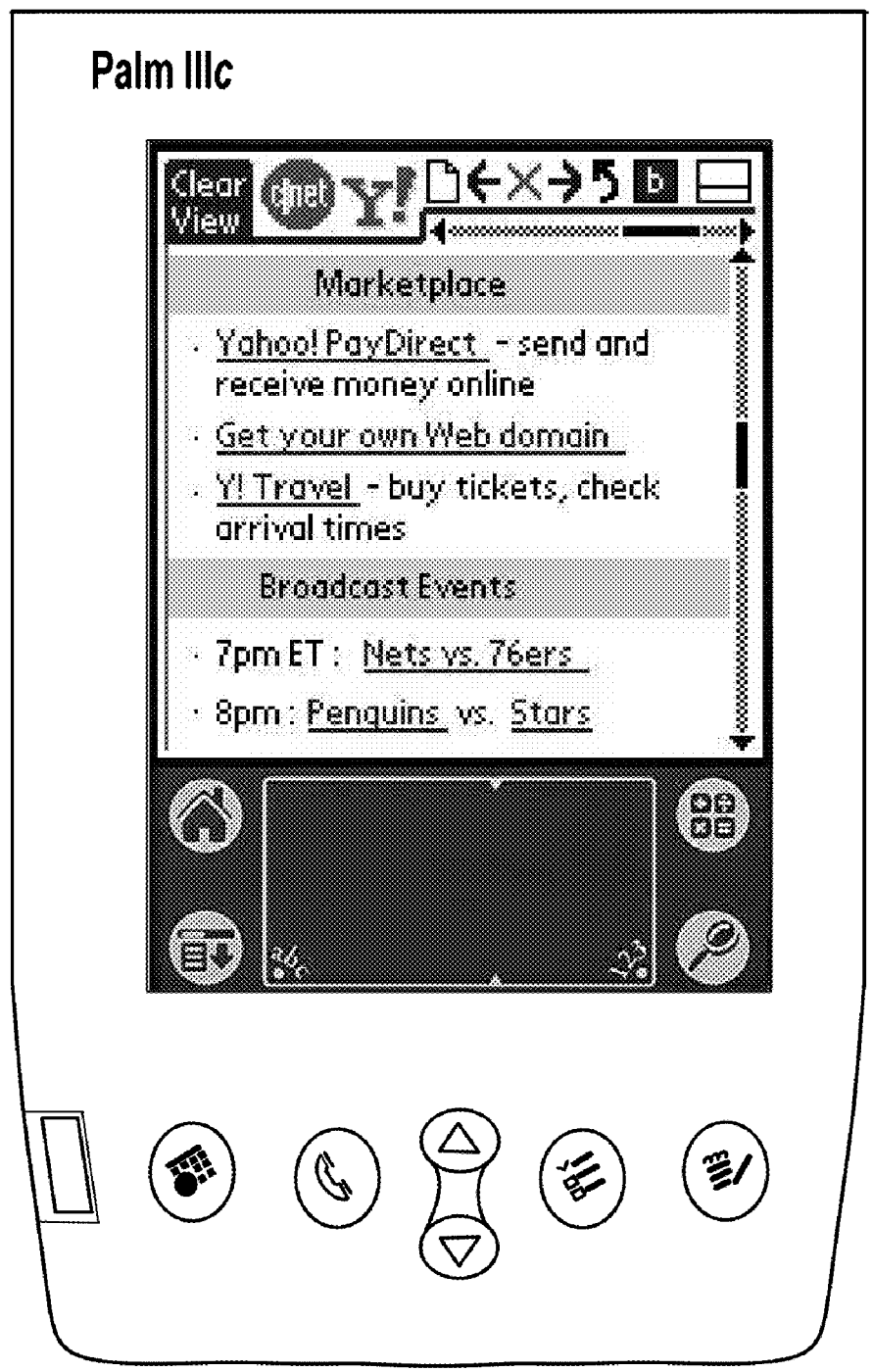

As discussed above, it is foreseen that the invention will be used with client devices having small, low resolution displays, such as PDAs and pocket PCs. Examples of various views of an exemplary web pages obtained from the YAHOO™ web site are shown in FIGS. 7A-B, 8A-B and 9A-B. For instance, FIG. 7A represents how the YAHOO™ home page might appear on a Palm IIIc color PDA.

Figure 8A:
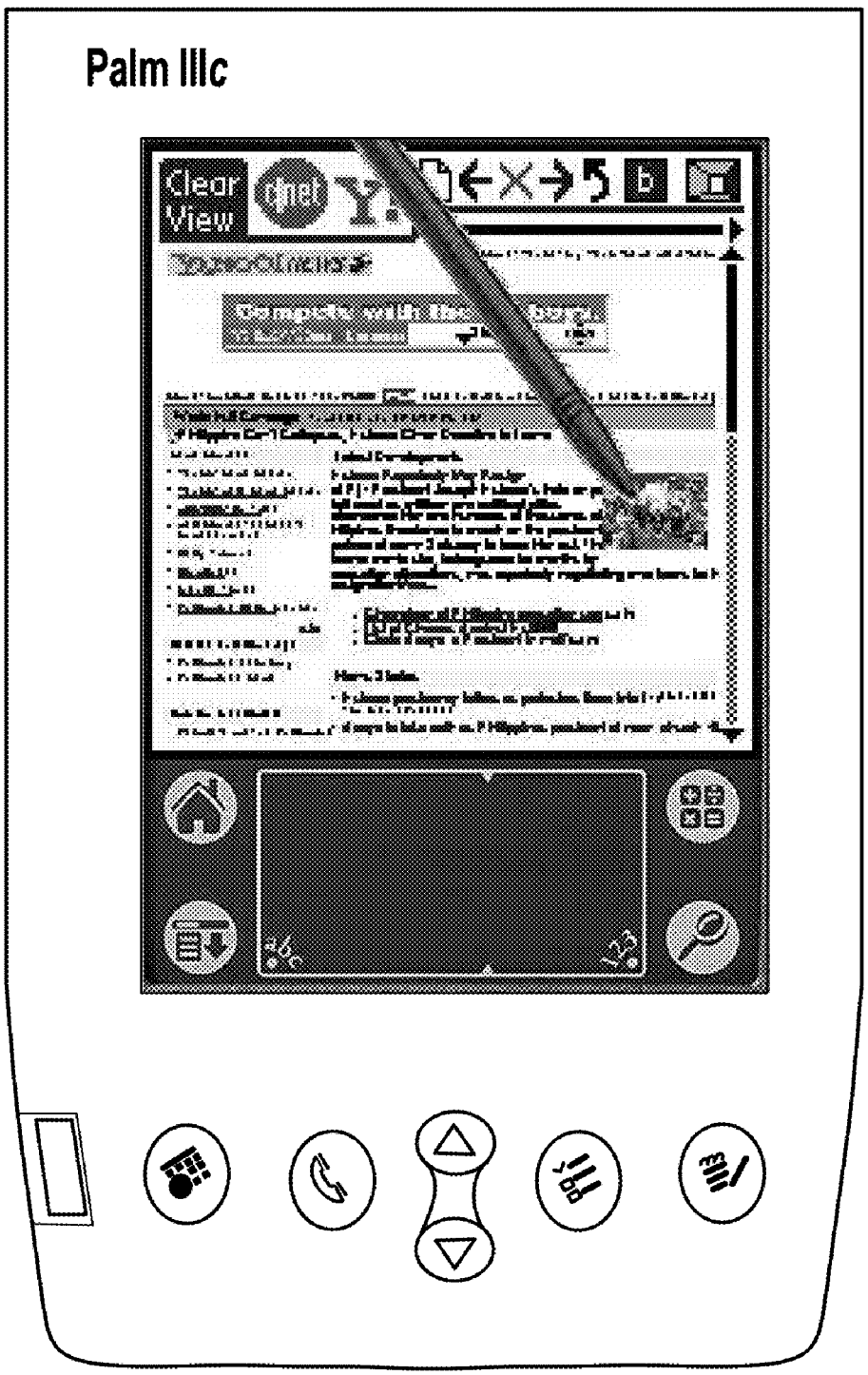
FIGS. 8A and 8B are representation of nominal and zoomed in view of an exemplary graphic image as they might appear on the Palm device.
Figure 8B:
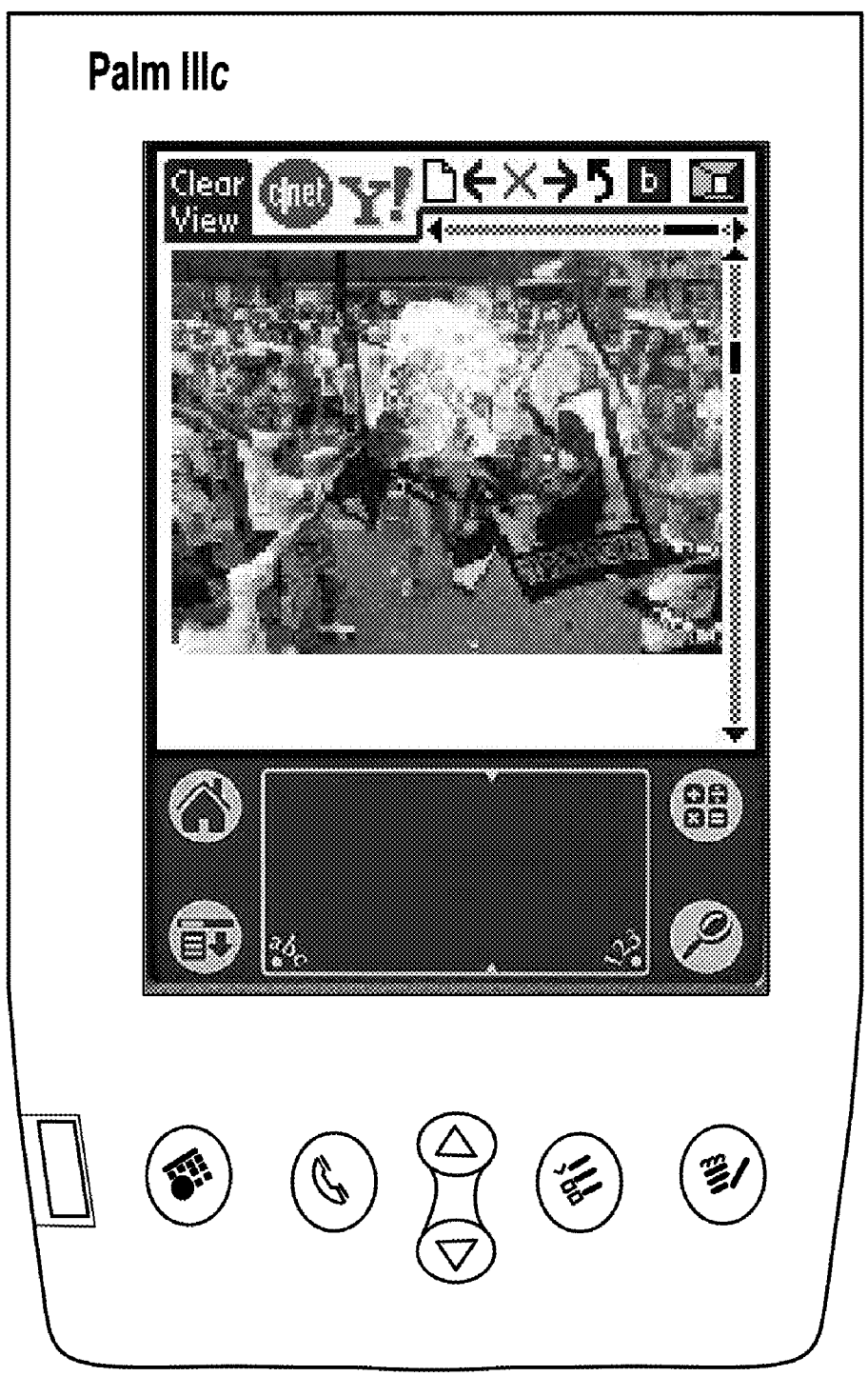
Figure 9A:
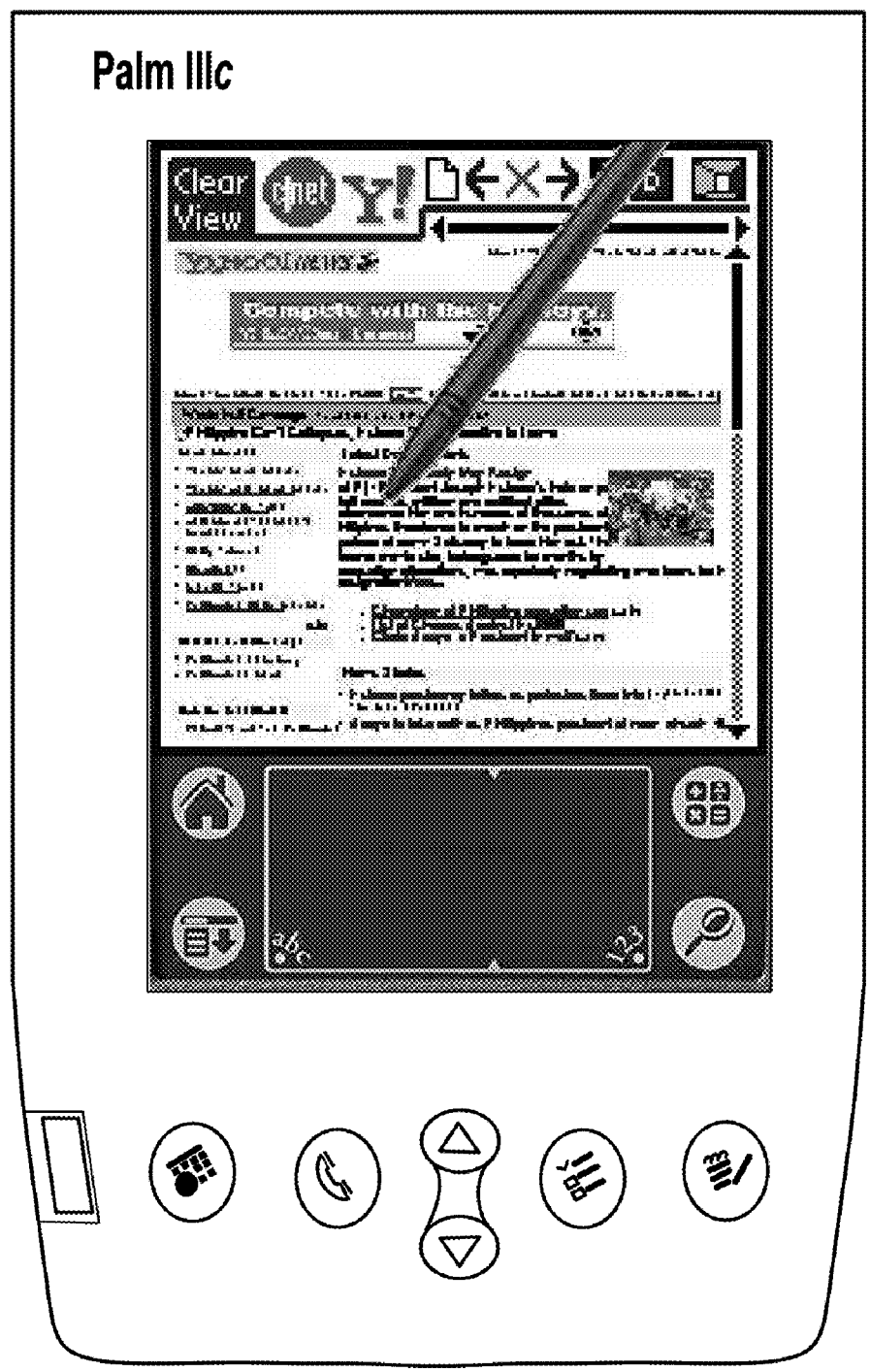
FIGS. 9A and 9B are representations of a nominal and zoomed in view of a text portion of a web page as they might appear on the Palm device.
Figure 9B:
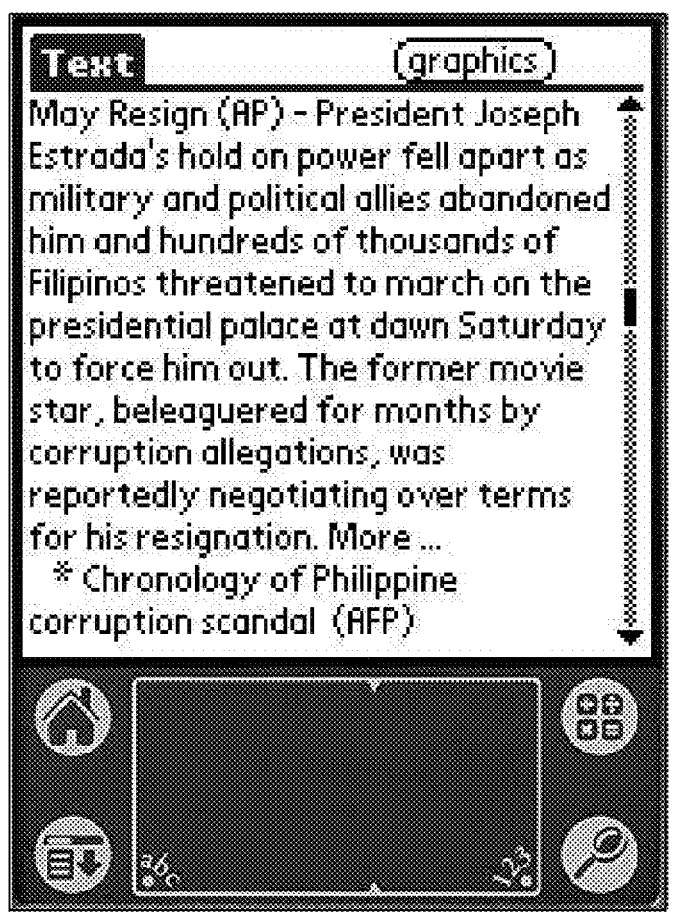

In addition to directly scaling and offsetting content, the client user-interface software for PDA's provides additional functionality. For instance, a user may select to view a column (results represented in FIG. 7B by tapping that column with a stylus, a shown in FIG. 7A. Similarly, the user may select to zoom in on an image by tapping the image with the stylus, as shown in FIGS. 8A and 8B, or select to view a paragraph in an article by tapping on the paragraph, as shown in FIGS. 9A and 9B. It is noted that in some instances, the display of the paragraph may be reformatted to fit the characteristics of the display, rather than following the original format in the zoom-out view.

It is further noted that that different scaling factors can be applied to the X and Y axis so as to change the aspect ratio of the display. For example, a Web page may be designed to be displayed on a computer having a resolution of 800×600 pixels, or a 4X to 3Y aspect ratio. In this case, the display corresponds to a "landscape" layout, wherein there are more pixels along the X axis than along the Y axis. Conversely, many handheld devices display images having a "portrait" layout, wherein there are more pixels along the Y axis than the X axis. By enabling different scaling factors to be applied to the X and Y axes, the present invention enables the aspect ratio of a rendered display image to be adjusted to better fit the aspect ratio of the client device.

An Exemplary Computer Architecture

Figure 10:
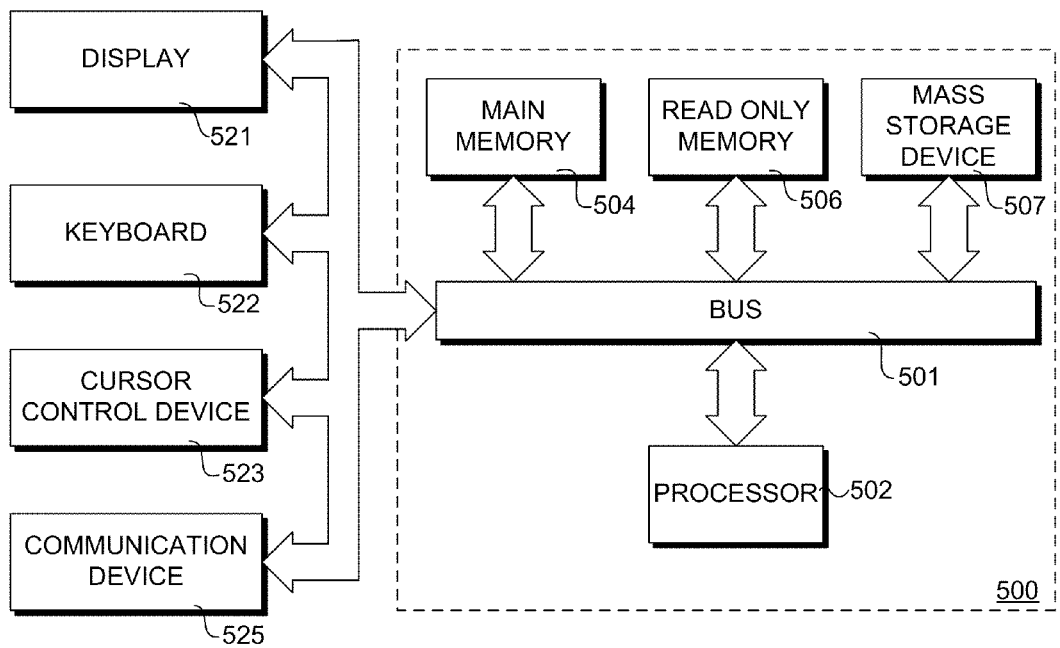
FIG. 10 illustrates an exemplary computer system that may be used for implementing various aspects of embodiments of the invention.

An exemplary machine in the form of a computer system 500 in which features of the present invention may be implemented will now be described with reference to FIG. 10. Computer system 500 may represent a workstation, host, server, print server, or printer controller. Computer system 500 comprises a bus or other communication means 501 for communicating information, and a processing means such as processor 502 coupled with bus 501 for processing information. Computer system 500 further comprises a random access memory (RAM) or other dynamic storage device 504 (referred to as main memory), coupled to bus 501 for storing information and instructions to be executed by processor 502. Main memory 504 also may be used for storing temporary variables or other intermediate information during execution of instructions by processor 502. Computer system 500 also comprises a read only memory (ROM) and/or other static storage device 506 coupled to bus 501 for storing static information and instructions for processor 502.

A data storage device 507 such as a magnetic disk or optical disc and its corresponding drive may also be coupled to bus 501 for storing information and instructions. Computer system 500 can also be coupled via bus 501 to a display device 521, such as a cathode ray tube (CRT) or Liquid Crystal Display (LCD), for displaying information to an end user. Typically, an alphanumeric input device 522, including alphanumeric and other keys, may be coupled to bus 501 for communicating information and/or command selections to processor 502. Another type of user input device is cursor control 523, such as a mouse, a trackball, or cursor direction keys for communicating direction information and command selections to processor 502 and for controlling cursor movement on display 521.

A communication device 525 is also coupled to bus 501. Depending upon the particular presentation environment implementation, the communication device 525 may include a modem, a network interface card, or other well-known interface devices, such as those used for coupling to Ethernet, token ring, or other types of physical attachment for purposes of providing a communication link to support a local or wide area network, for example. In any event, in this manner, the computer system 500 may be coupled to a number of clients and/or servers via a conventional network infrastructure, such as a company's Intranet and/or the Internet, for example.

Importantly, the present invention is not limited to having all of the routines located on the same computer system. Rather, individual objects, program elements, or portions thereof may be spread over a distributed network of computer systems. Additionally, it is appreciated that a lesser or more equipped computer system than the example described above may be desirable for certain implementations. Therefore, the configuration of computer system 500 will vary from implementation to implementation depending upon numerous factors, such as price constraints, performance requirements, and/or other circumstances. For example, according to one embodiment of the present invention, a cell phone or a hand held computer may comprise only a processor or a micro controller and a memory, such as a micro code ROM or RAM, for storing static or dynamically loaded instructions and/or data.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
    enabling a user to request, via a browser client on a client device, access to a Web page comprising HTML-based content defining an original page layout and design of content on the Web page, the original page layout having a width of at least 800 pixels, the content including a plurality of text objects and image objects; and, in response thereto,
    receiving, at the client device, translated content generated by a proxy server associated with the browser client, the translated content generated, in part, via processing the HTML-based content using a rendering engine to interpret the Web page layout and design; and
    employing the translated content and/or data derived therefrom via the browser client to,
        render a view of at least a portion of the Web page on a display of the client device using a first zoom level;
        re-render views of the Web page on the display in response to associated user inputs to enable the user to zoom in and out a view of the Web page on the display using a plurality of zoom levels; and
        enable the user to view an entirety of the Web page at each of the plurality of zoom levels by panning views of the Web page when at that zoom level,
        wherein the original page layout and design, as interpreted by the rendering engine, is preserved at each zoom level, and wherein the user is enabled to view a full width of the Web page at least one zoom level.

2. The method of claim 1, wherein the client device comprises a mobile hand-held device.

3. The method of claim 1, wherein the translated content includes scalable content, and wherein the browser client applies a scale factor to the scalable content to produce views of the Web page at a zoom level corresponding to the scale factor.

4. The method of claim 3, wherein the scalable content includes vector-based page layout information.

5. The method of claim 4, wherein the Web page comprises a plurality of objects comprising at least two of text objects, graphic layout objects, graphic objects and/or image objects, and the translated scalable content includes an object vector and an object bounding box associated with each object and defining a layout location of the object.

6. The method of claim 5, further comprising:
mapping the object vectors and associated bounding boxes to a virtual display area in memory on the client device; and
employing the object vectors and bounding boxes to layout content on the virtual display area.

7. The method of claim 6, further comprising:
determining a first scale factor and offset in response to one or more corresponding user inputs defining a user-selectable zoom level and pan corresponding to a rendered view of the Web page desired by a user;
determining a virtual display limit bounding box for the virtual display area associated with the first scale factor and offset;
identifying object bounding boxes having at least a portion falling within the virtual display limit bounding box; and,
for each of such object bounding boxes,
retrieving object content associated with that object bounding box;
determining an applicable datum offset at which the object content is to be rendered on the display;
determining an applicable scale factor to be employed to render the object content; and
employing the applicable datum offset, the applicable scale factor and the virtual display limit bounding box to render the object content on the display.

8. The method of claim 7, wherein the virtual display area has a resolution that is independent of a resolution of the display.

9. The method of claim 7, wherein the virtual display area is associated with a fixed reference frame, and the virtual display limit bounding box is maintained to have a size matching the resolution of the content display area defined for the display by the browser client.

10. The method of claim 1, further comprising:
generating a request of the Web page containing indicia indicating the request is to be routed to the proxy server for translation; and
sending the request to one of the proxy server or a service provider gateway via which the request is to be routed to the proxy server.

11. The method of claim 3, wherein the page layout of the Web page is defined to have an original aspect ratio, and wherein the translated scalable content and/or or data derived therefrom is scaled to render a view having a different aspect ratio.

12. The method of claim 3, wherein the translated scalable content includes text content, scalable layout information, and image content, the method further comprising:
receiving data corresponding to the text content and scalable layout information via a first connection; and
receiving content corresponding to at least one image via a second connection.

13. The method of claim 3, further comprising:
generating a vector-based display list derived, at least in part, via use of the translated scalable content; and
employing the display list to re-render views of the Web page.

14. The method of claim 1, wherein the HTML-based Web content includes at least one hyperlink, the method further comprising:
enabling the user to select a hyperlink to a second Web page via the browser client; and, in response thereto,
generating a request to access the second Web page and sending the request to the proxy server;
receiving additional translated content from the proxy server corresponding to the second Web page; and
employing the additional translated content and/or data derived therefrom to render a view of the second Web page on the display.

15. The method of claim 1, wherein the translated content includes a plurality of text objects, each text object including text associated with the object, a typefont and size for the text, and scalable layout information used for laying out the text on a scaled page layout, the method further comprising:
determining a layout location of a text object on a to be rendered page view;
determining an applicable scale factor to be applied to render the text; and
applying the scale factor to a scalable typefont corresponding to the typefont of the text.

16. The method of claim 1, further comprising:
enabling the user to select an area of the Web page view to zoom in on via an associated user input; and
in response thereto,
re-rendering the display such that content in the selected area is scaled to be rendered substantially across at least one of a width and a height of the display.

17. The method of claim 1, further comprising enabling the user to pan a view of the Web page substantially in real-time.

18. The method of claim 1, further comprising enabling a user to zoom a view of a column of the Web content via an associated user input, wherein in response to the user input, the display is re-rendered such that content corresponding to the column is enlarged.

19. The method of claim 18, wherein the associated user input comprises tapping on content in the column via the display.

20. The method of claim 1, wherein the Web content includes at least one image, the method further comprising enabling a user to zoom on an image via an associated user input, wherein in response to the user input, the display is re-rendered such that the image is enlarged.

21. The method of claim 1, further comprising enabling a user to view text content in a paragraph of the Web content at a greater resolution than a current resolution via an associated user input, wherein in response to the user input, the display is re-rendered such that content corresponding to the selected paragraph is enlarged.

22. The method of claim 21, wherein the content of the paragraph is reformatted to fit characteristics of the display when the display is re-rendered.

23. The method of claim 1, wherein the translated content includes translated image content comprising image thumbnail data and image data corresponding to one of an original or compressed image content, the method further comprising:
receiving image thumbnail data for an image;
rendering the image thumbnail on the display;

receiving the image data associated with the image; and processing and scaling the image data to re-render a portion of the display occupied by the thumbnail image to replace the thumbnail image with a scaled image.

24. The method of claim 1, wherein the client device comprises a mobile phone that receives translated content via a mobile service provider network, further comprising performing zooming operations in real-time.

25. The method of claim 1, wherein the method enables a user to browse billions of Web pages, wherein for each Web page the user is enabled to view an entirety of the Web page at each of a plurality of zoom levels, wherein the original page layout and design, as interpreted by the rendering engine, is preserved at each zoom level, and wherein the user is enabled to view a full width of the Web page at least one zoom level.

26. A mobile device, comprising:
processing means;
wireless communications means, to facilitate wireless communication with a network that supports access to the Internet;
display means, to display rendered content; and
storage means, in which a plurality of instructions comprising a browser client are stored,
wherein, upon execution of the instructions by said processing means, the mobile device is enabled to perform operations, including,
rendering a browser interface via which a user is enabled to request to access a Web page comprising HTML-based Web content defining an original page layout and design of content on the Web page, the content including a plurality of text objects and image objects;
receiving translated content generated by a proxy server associated with the browser client, the translated content generated, in part, via processing the HTML-based content using a rendering engine to interpret the Web page layout and design; and
employing the translated content and/or data derived therefrom to,
render a view of at least a portion of the Web page on a display of the client device using a first zoom level;
re-render views of the Web page on the display in response to associated user inputs to enable the user to zoom in and out a view of the Web page on the display means using at least two zoom levels; and
enable the user to view an entirety of the Web page at each zoom level by panning views of the Web page when at that zoom level,
wherein the original page layout and design, as interpreted by the rendering engine, is preserved at each zoom level, and wherein the user is enabled to view a full width of the Web page at least one zoom level.

27. The mobile device of claim 26, wherein the mobile device comprises a mobile phone.

28. The mobile device of claim 26, wherein the translated content includes scalable content, and wherein the browser client applies a scale factor to the scalable content to produce views of the Web page at a zoom level corresponding to the scale factor.

29. The mobile device of claim 28, wherein the page layout of the Web page is defined to have an original aspect ratio, and wherein the translated scalable content and/or or data derived therefrom is scaled to render a view having a different aspect ratio.

30. The mobile device of claim 29, wherein execution of the instructions perform further operations comprising enabling a user to zoom a view of a column of the Web content via an associated user input, wherein in response to the user input, the display is re-rendered such that content corresponding to the column is displayed across the display.

31. The mobile device of claim 30, wherein the associated user input comprises tapping on content in the column via the display.

32. The mobile device of claim 28, wherein the translated scalable content includes text content, scalable layout information, and image content, and wherein execution of the instructions perform further operations comprising:
receiving data corresponding to the text content and scalable layout information via a first connection; and
receiving content corresponding to at least one image via a second connection.

33. The mobile device of claim 26, wherein execution of the instructions performs further operations comprising:
generating a request of the Web page containing indicia indicating the request is to be routed to the proxy server for translation; and
sending the request to one of the proxy server or a service provider gateway via which the request is to be routed to the proxy server.

34. The mobile device of claim 26, wherein the HTML-based Web content includes at least one hyperlink, and wherein execution of the instructions perform further operations comprising:
enabling the user to select a hyperlink to a second Web page via the browser client; and, in response thereto,
generating a request to access the second Web page and sending the request to the proxy server;
receiving additional translated content from the proxy server corresponding to the second Web page; and
employing the additional translated content and/or data derived therefrom to render a view of the second Web page on the display.

35. The mobile device of claim 26, wherein the scalable content includes vector-based page layout information.

36. The mobile device of claim 35, wherein the Web page comprises a plurality of objects comprising at least two of text objects, graphic layout objects, graphic objects and/or image objects, and the translated scalable content includes an object vector and an object bounding box associated with each object and defining a layout location of the object.

37. The mobile device of claim 36, further comprising dynamic memory having at least a portion employed for rendering purposes, wherein execution of the instructions perform further operations comprising:
mapping the object vectors and associated bounding boxes to a virtual display area in the dynamic memory on the client device; and
employing the object vectors and bounding boxes to layout content on the virtual display area.

38. The mobile device of claim 37, wherein execution of the instructions perform further operations comprising:
determining a first scale factor and offset in response to one or more corresponding user inputs defining a user-selectable zoom level and pan corresponding to a rendered view of the Web page desired by a user;
determining a virtual display limit bounding box for the virtual display area associated with the first scale factor and offset;
identifying object bounding boxes having at least a portion falling within the virtual display limit bounding box; and,
for each of such object bounding boxes,
retrieving object content associated with that object bounding box;

determining an applicable datum offset at which the object content is to be rendered on the display;

determining an applicable scale factor to be employed to render the object content; and employing the applicable datum offset, the applicable scale factor and the virtual display limit bounding box to render the object content on the display.

39. The mobile device of claim 38, wherein the virtual display area has a resolution that is independent of a resolution of the display.

40. The mobile device of claim 38, wherein the virtual display area is associated with a fixed reference frame, and the virtual display limit bounding box is maintained to have a size matching the resolution of the content display area defined for the display by the browser client.

41. The mobile device of claim 26, wherein the translated content includes a plurality of text objects, each text object including text associated with the object, a typefont and size for the text, and scalable layout information used for laying out the text on a scaled page layout, and wherein execution of the instructions perform further operations comprising:

determining a layout location of a text object on a to be rendered page view;

determining an applicable scale factor to be applied to render the text; and applying the scale factor to a scalable typefont corresponding to the typefont of the text.

42. The mobile device of claim 26, wherein execution of the instructions perform further operations comprising:

enabling the user to select an area of the Web page view to zoom in on via an associated user input; and in response thereto, re-rendering the display such that content in the selected area is rendered substantially across at least one of a width and a height of the display.

43. The mobile device of claim 26, wherein execution of the instructions perform further operations comprising enabling the user to pan a view of the Web page substantially in real-time.

44. The mobile device of claim 26, wherein the Web content includes at least one image, and wherein execution of the instructions perform further operations comprising enabling a user to zoom on an image via an associated user input, wherein in response to the user input, the display is re-rendered such that the image is displayed substantially across at least one of a width and height of the display.

45. The mobile device of claim 44, wherein the associated user input comprises tapping on the image via the display.

46. The mobile device of claim 26, wherein execution of the instructions perform further operations comprising enabling a user to view text content in a paragraph of the Web content at a greater resolution than a current resolution via an associated user input, wherein in response to the user input, the display is re-rendered such that content corresponding to the selected paragraph is enlarged.

47. The mobile device of claim 46, wherein the content of the paragraph is reformatted to fit characteristics of the display when the display is re-rendered.

48. The mobile device of claim 26, wherein the translated content includes translated image content comprising image thumbnail data and image data corresponding to one of an original or compressed image content, and wherein execution of the instructions perform further operations comprising:

receiving image thumbnail data for an image;

rendering the image thumbnail on the display;

receiving the image data associated with the image; and processing and scaling the image data to re-render a portion of the display occupied by the thumbnail image to replace the thumbnail image with a scaled image.

49. The mobile device of claim 1, wherein at least a portion of the instructions comprise Java-based instructions configured to be executed on a Java virtual machine.

50. The mobile device of claim 26, wherein the processing means includes programmed circuitry that is employed to perform at least a portion of the operations.

51. The mobile device of claim 26, wherein the mobile device comprises a mobile phone and the network comprises a mobile service provider network, and wherein execution of the instructions performs zooming operations in real-time.

52. The mobile device of claim 26, wherein execution of the instructions enables a user to browse billions of Web pages, wherein for each Web page the user is enabled to view an entirety of the Web page at each of a plurality of zoom levels, wherein the original page layout and design, as interpreted by the rendering engine, is preserved at each zoom level, and wherein the user is enabled to view a full width of the Web page at least one zoom level.

53. A tangible non-transitory machine-readable medium having stored thereon a plurality of instructions comprising a browser client that when executed by a mobile hand-held device having a display performs operations comprising:

rendering a browser interface via which a user is enabled to request to access a Web page comprising HTML-based Web content defining an original page layout and design of content on the Web page, the content including a plurality of text objects and image objects;

receiving translated content generated by a proxy server associated with the browser client, the translated content generated, in part, via processing the HTML-based content using a rendering engine to interpret the Web page layout and design; and employing the translated content and/or data derived therefrom to, render a view of at least a portion of the Web page on a display of the mobile hand-held device using a first zoom level;

re-render views of the Web page on the display in response to associated user inputs to enable the user to zoom in and out a view of the Web page on the display using at plurality of zoom levels; and enable the user to view an entirety of the Web page at each of the plurality of zoom levels by panning views of the Web page when at that zoom level, wherein the original page layout and design, as interpreted by the rendering engine, is preserved at each zoom level, and wherein the user is enabled to view a full width of the Web page at least one zoom level.

54. The machine-readable medium of claim 53, wherein the mobile device comprises a mobile phone.

55. The machine-readable medium of claim 53, wherein the translated content includes scalable content, and wherein the browser client applies a scale factor to the scalable content to produce views of the Web page using a zoom level corresponding to the scale factor.

56. The machine-readable medium of claim 55, wherein the scalable content includes vector-based page layout information.

57. The machine-readable medium of claim 56, wherein the Web page comprises a plurality of objects comprising at least two of text objects, graphic layout objects, graphic objects and/or image objects, and the translated scalable content includes an object vector and an object bounding box associated with each object and defining a layout location of the object.

58. The machine-readable medium of claim 57, wherein the mobile hand-held device includes dynamic memory having at least a portion employed for rendering purposes, wherein execution of the instructions perform further operations comprising:
mapping the object vectors and associated bounding boxes to a virtual display area in the dynamic memory on the mobile hand-held device; and
employing the object vectors and bounding boxes to layout content on the virtual display area.

59. The machine-readable medium of claim 58, wherein execution of the instructions perform further operations comprising:
determining a first scale factor and offset in response to one or more corresponding user inputs defining a user-selectable zoom level and pan corresponding to a rendered view of the Web page desired by a user;
determining a virtual display limit bounding box for the virtual display area associated with the first scale factor and offset;
identifying object bounding boxes having at least a portion falling within the virtual display limit bounding box; and,
for each of such object bounding boxes,
retrieving object content associated with that object bounding box;
determining an applicable datum offset at which the object content is to be rendered on the display;
determining an applicable scale factor to be employed to render the object content; and
employing the applicable datum offset, the applicable scale factor and the virtual display limit bounding box to render the object content on the display.

60. The machine-readable medium of claim 59, wherein the virtual display area has a resolution that is independent of a resolution of the display.

61. The machine-readable medium of claim 59, wherein the virtual display area is associated with a fixed reference frame, and the virtual display limit bounding box is maintained to have a size matching the resolution of the content display area defined for the display by the browser client.

62. The machine-readable medium of claim 53, wherein execution of the instructions performs further operations comprising:
generating a request of the Web page containing indicia indicating the request is to be routed to the proxy server for translation; and
sending the request to one of the proxy server or a service provider gateway via which the request is to be routed to the proxy server.

63. The machine-readable medium of claim 55, wherein the page layout of the Web page is defined to have an original aspect ratio, and wherein the translated scalable content and/or or data derived therefrom is scaled to render a view having a different aspect ratio.

64. The machine-readable medium of claim 63, wherein execution of the instructions perform further operations comprising enabling a user to zoom a view of a column of the Web content via an associated user input, wherein in response to the user input, the display is re-rendered such that content corresponding to the column is enlarged.

65. The machine-readable medium of claim 64, wherein the associated user input comprises tapping on content in the column via the display.

66. The machine-readable medium of claim 55, wherein the translated scalable content includes text content, scalable layout information, and image content, and wherein execution of the instructions perform further operations comprising:
receiving data corresponding to the text content and scalable layout information via a first connection; and
receiving content corresponding to at least one image via a second connection.

67. The machine-readable medium of claim 53, wherein the HTML-based Web content includes at least one hyperlink, and wherein execution of the instructions perform further operations comprising:
enabling the user to select a hyperlink to a second Web page via the browser client; and, in response thereto,
generating a request to access the second Web page and sending the request to the proxy server;
receiving additional translated content from the proxy server corresponding to the second Web page; and
employing the additional translated content and/or data derived therefrom to render a view of the second Web page on the display.

68. The machine-readable medium of claim 53, wherein the translated content includes a plurality of text objects, each text object including text associated with the object, a typefont and size for the text, and scalable layout information used for laying out the text on a scaled page layout, and wherein execution of the instructions perform further operations comprising:
determining a layout location of a text object on a to be rendered page view;
determining an applicable scale factor to be applied to render the text; and
applying the scale factor to a scalable typefont corresponding to the typefont of the text.

69. The machine-readable medium of claim 53, wherein execution of the instructions perform further operations comprising:
enabling the user to select an area of the Web page view to zoom in on via an associated user input; and
in response thereto,
re-rendering the display such that content in the selected area is rendered substantially across at least one of a width and a height of the display.

70. The machine-readable medium of claim 53, wherein execution of the instructions perform further operations comprising enabling the user to pan a view of the Web page substantially in real-time.

71. The machine-readable medium of claim 53, wherein the Web content includes at least one image, and wherein execution of the instructions perform further operations comprising enabling a user to zoom on an image via an associated user input, wherein in response to the user input, the display is re-rendered such that the image is enlarged.

72. The machine-readable medium of claim 71, wherein the associated user input comprises tapping on the image via the display.

73. The machine-readable medium of claim 53, wherein execution of the instructions perform further operations comprising enabling a user to view text content in a paragraph of the Web content at a greater resolution than a current resolution via an associated user input, wherein in response to the user input, the display is re-rendered such that content corresponding to the selected paragraph is enlarged.

74. The machine-readable medium of claim 73, wherein the content of the paragraph is reformatted to fit characteristics of the display when the display is re-rendered.

75. The machine-readable medium of claim 53, wherein the translated content includes translated image content comprising image thumbnail data and image data corresponding to one of an original or compressed image content, and wherein execution of the instructions perform further operations comprising:
   receiving image thumbnail data for an image;
   rendering the image thumbnail on the display;
   receiving the image data associated with the image; and
   processing and scaling the image data to re-render a portion of the display occupied by the thumbnail image to replace the thumbnail image with a scaled image.

76. The machine-readable medium of claim 53, further comprising:
   generating a display list derived, at least in part, via use of the translated content; and
   employing the display list to render views of the Web page.

77. The machine-readable medium of claim 53, wherein at least a portion of the instructions comprise Java-based instructions configured to be executed on a Java virtual machine.

78. The machine-readable medium of claim 53, wherein the mobile hand-held device comprises a mobile phone and the translated content is received via a mobile service provider network, and wherein execution of the instructions performs zooming operations in real-time.

79. The machine-readable medium of claim 53, wherein execution of the instructions enables a user to browse billions of Web pages, wherein for each Web page the user is enabled to view an entirety of the Web page at each of a plurality of zoom levels, wherein the original page layout and design, as interpreted by the rendering engine, is preserved at each zoom level, and wherein the user is enabled to view a full width of the Web page at least one zoom level.

80. A device comprising:
   communications means for enabling the device to be linked to a network that supports access to the Internet;
   display means;
   means for enabling a user to request access to a Web page comprising HTML-based content defining an original page layout and design of content on the Web page, the content including a plurality of text objects and image objects;
   means for receiving translated scalable content comprising a scalable representation of the Web page, said translated scalable content supporting a scalable resolution-independent display of the Web page that substantially preserves the original page layout and design of the Web page content when it is rendered by the device;
   means for rendering a first view of the Web page on the display means via use of the translated scalable content using a first scaling factor;
   means for enabling a user to zoom in and out views of the Web page on the display means and pan views of the Web page, wherein the original page layout and design of the Web page content is preserved at each of multiple zoom levels and the user is enabled to view an entirety of the Web page content corresponding to the HTML-based content at each zoom level.

81. The device of claim 80, further comprising:
   means for enabling a user of the device to select an area of the Web page to zoom in on, and in response thereto, re-rendering the view of the Web page to enlarge the selected area.

82. The device of claim 80, further comprising:
   means for enabling a user to zoom on a column of the Web page via an associated user input, wherein in response to the user input, the display means is re-rendered such that content corresponding to the column is displayed substantially across the display means.

83. The device of claim 80, further comprising:
   means for enabling a user to zoom on an image in the Web content via an associated user input, wherein in response to the user input, the display means is re-rendered such that image is displayed substantially across the display means.

84. The device of claim 80, wherein the device comprises a mobile device, and the communication means includes a wireless transceiver to enable the device to be linked to the network via a wireless link.

85. The device of claim 80, wherein the translated scalable content includes scalable vector-based page layout information.

86. The device of claim 80, further comprising means for generating a scalable display list via use of the translated scalable content, wherein the scalable display list content is configured to be scaled to render the Web page at different scale factors.

* * * * *